(12) United States Patent
Dietle et al.

(10) Patent No.: US 9,121,504 B2
(45) Date of Patent: Sep. 1, 2015

(54) ROTARY SEAL WITH IMPROVED FILM DISTRIBUTION

(71) Applicant: Kalsi Engineering, Inc., Sugar Land, TX (US)

(72) Inventors: Lannie Laroy Dietle, Houston, TX (US); John Erick Schroeder, Richmond, TX (US)

(73) Assignee: Kalsi Engineering, Inc., Sugar Land, TX (US)

( * ) Notice: Subject to any disclaimer, the term of this patent is extended or adjusted under 35 U.S.C. 154(b) by 0 days.

(21) Appl. No.: 14/028,066

(22) Filed: Sep. 16, 2013

(65) Prior Publication Data
US 2014/0008875 A1      Jan. 9, 2014

Related U.S. Application Data

(60) Division of application No. 12/231,348, filed on Sep. 2, 2008, now Pat. No. 8,550,467, which is a continuation-in-part of application No. 11/386,209, filed on Mar. 22, 2006, now Pat. No. 7,562,878.

(60) Provisional application No. 60/967,174, filed on Aug. 31, 2007, provisional application No. 60/999,957, filed on Oct. 23, 2007, provisional application No. 61/067,411, filed on Feb. 28, 2008.

(51) Int. Cl.
*F16J 15/32*      (2006.01)
*F16J 15/16*      (2006.01)

(52) U.S. Cl.
CPC ............ *F16J 15/3244* (2013.01); *F16J 15/164* (2013.01); *F16J 15/324* (2013.01); *F16J 15/3208* (2013.01); *F16J 15/3236* (2013.01)

(58) Field of Classification Search
CPC .............................. F16J 15/324; F16J 15/3244
USPC ......................................................... 277/559
See application file for complete search history.

(56) References Cited

U.S. PATENT DOCUMENTS

| | | | | | |
|---|---|---|---|---|---|
| 4,610,319 | A | * | 9/1986 | Kalsi ............................... | 175/371 |
| 4,729,569 | A | * | 3/1988 | Muller et al. .................. | 277/584 |
| 5,140,904 | A | * | 8/1992 | Schonlau .......................... | 92/27 |
| 5,678,829 | A | * | 10/1997 | Kalsi et al. .................... | 277/559 |
| 5,873,576 | A | * | 2/1999 | Dietle et al. ................... | 277/559 |
| 6,109,618 | A | * | 8/2000 | Dietle ........................... | 277/559 |
| 2001/0045704 | A1 | * | 11/2001 | Kalsi et al. .................... | 277/549 |
| 2004/0155411 | A1 | * | 8/2004 | Cargill .......................... | 277/549 |

* cited by examiner

*Primary Examiner* — Vishal Patel
(74) *Attorney, Agent, or Firm* — Douglas W. Rommelmann; Andrews Kurth LLP

(57) ABSTRACT

The present invention is a generally circular rotary seal that establishes sealing between relatively rotatable machine components for lubricant retention and environmental exclusion, and incorporates seal geometry that interacts with the lubricant during relative rotation to distribute a lubricant film within the dynamic sealing interface. The features of a variable inlet size, a variable dynamic lip flank slope, and a reduction in the magnitude and circumferentially oriented portion of the lubricant side interfacial contact pressure zone at the narrowest part of the lip, individually or in combination thereof, serve to maximize interfacial lubrication in severe operating conditions, and also serve to minimize lubricant shear area, seal torque, seal volume, and wear, while ensuring retrofitability into the seal grooves of existing equipment.

99 Claims, 21 Drawing Sheets

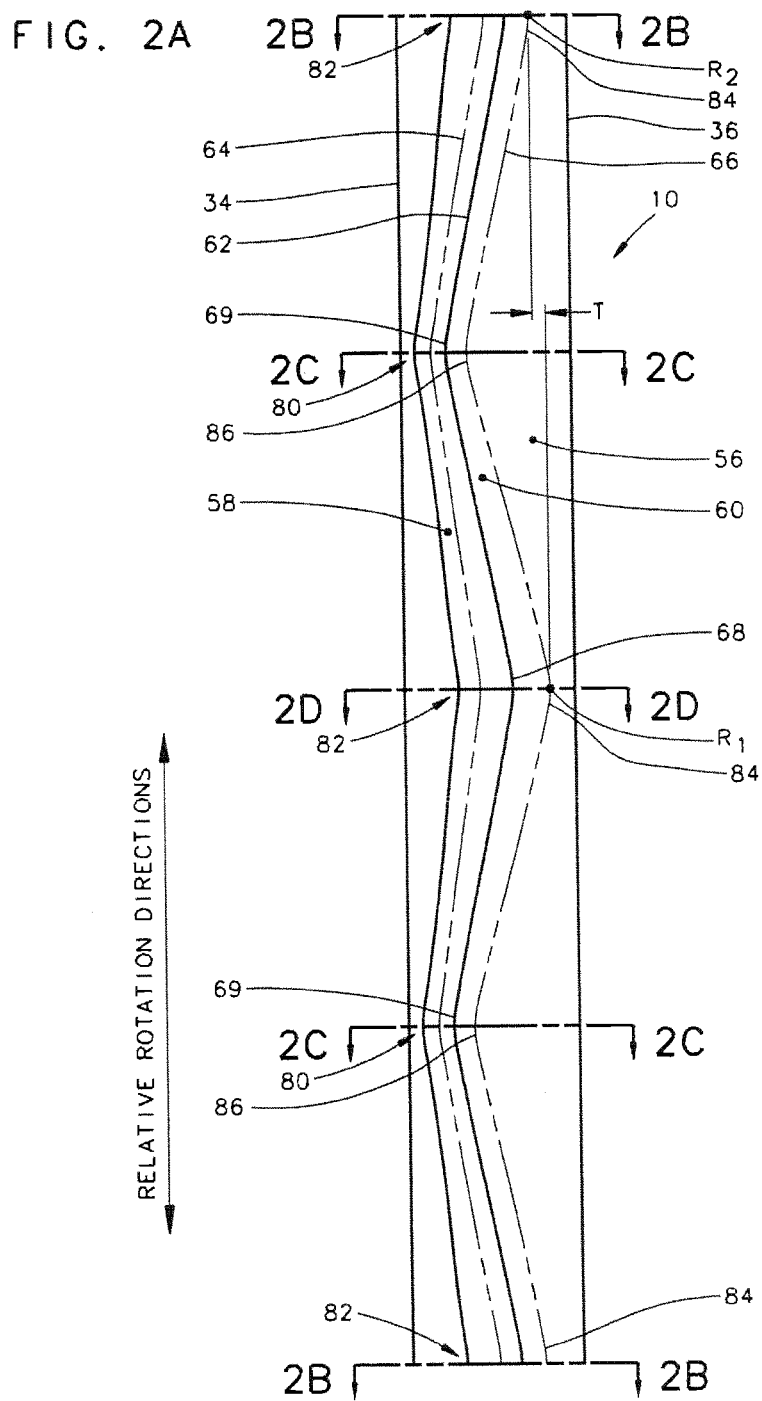

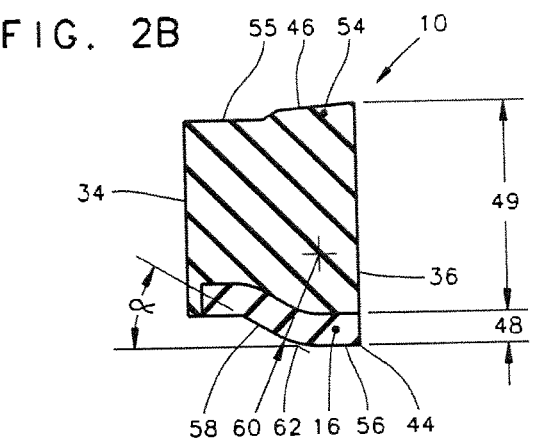
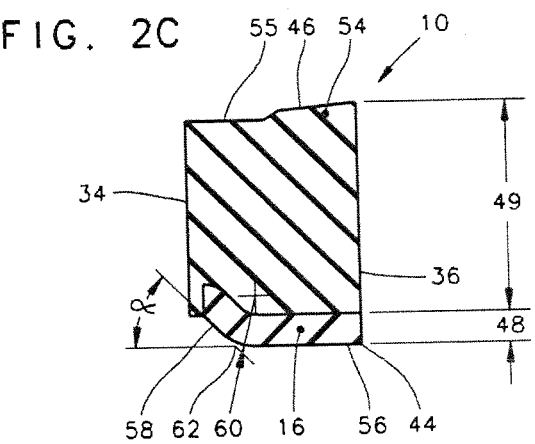
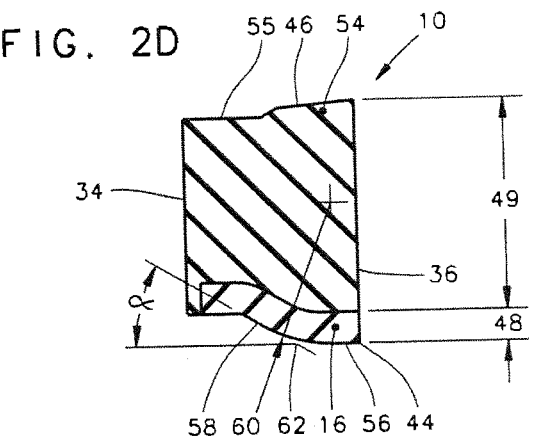

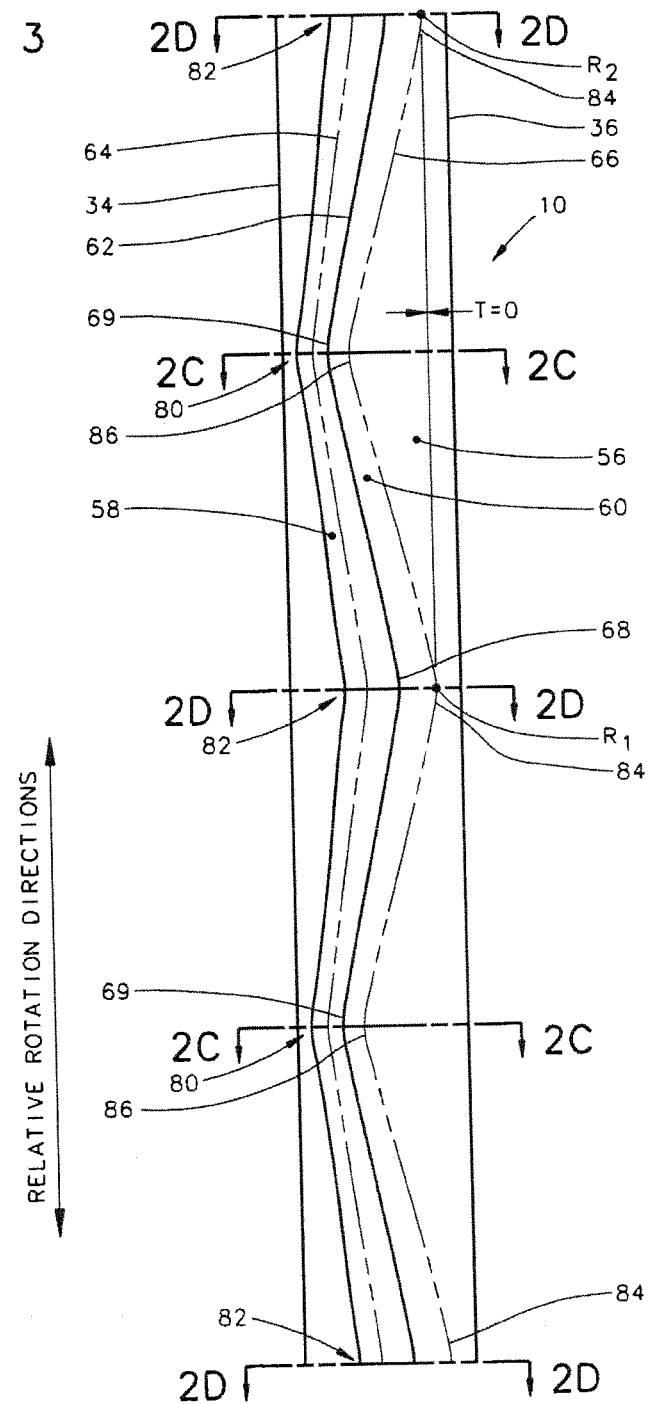

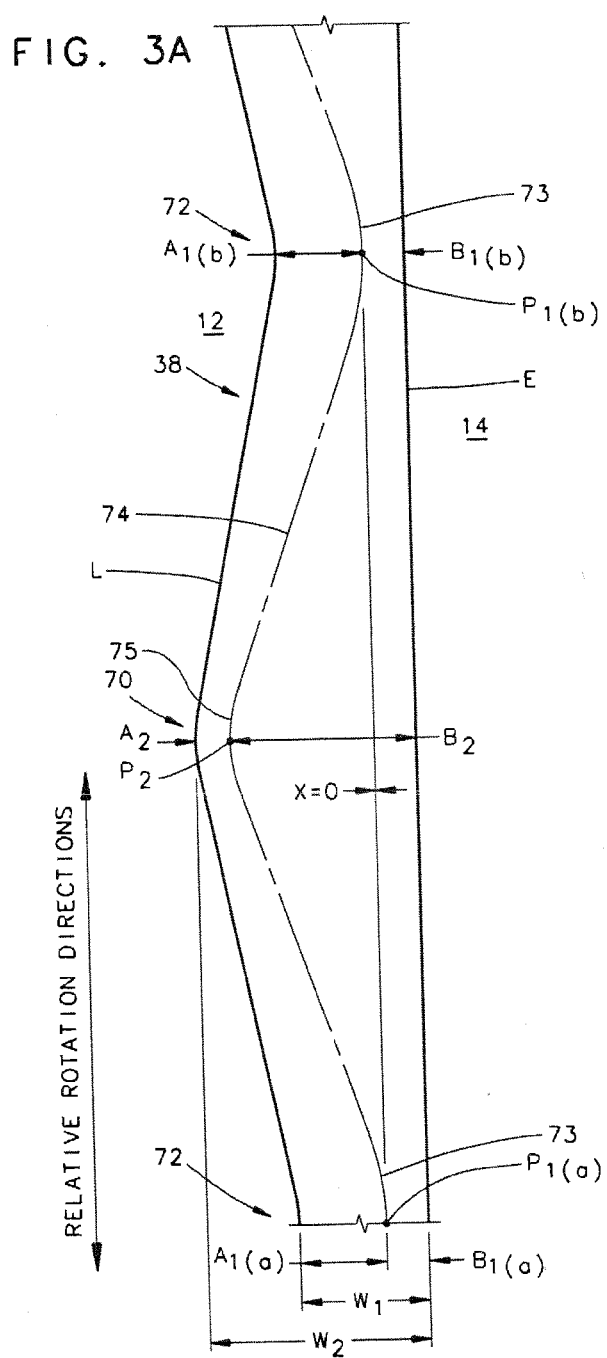

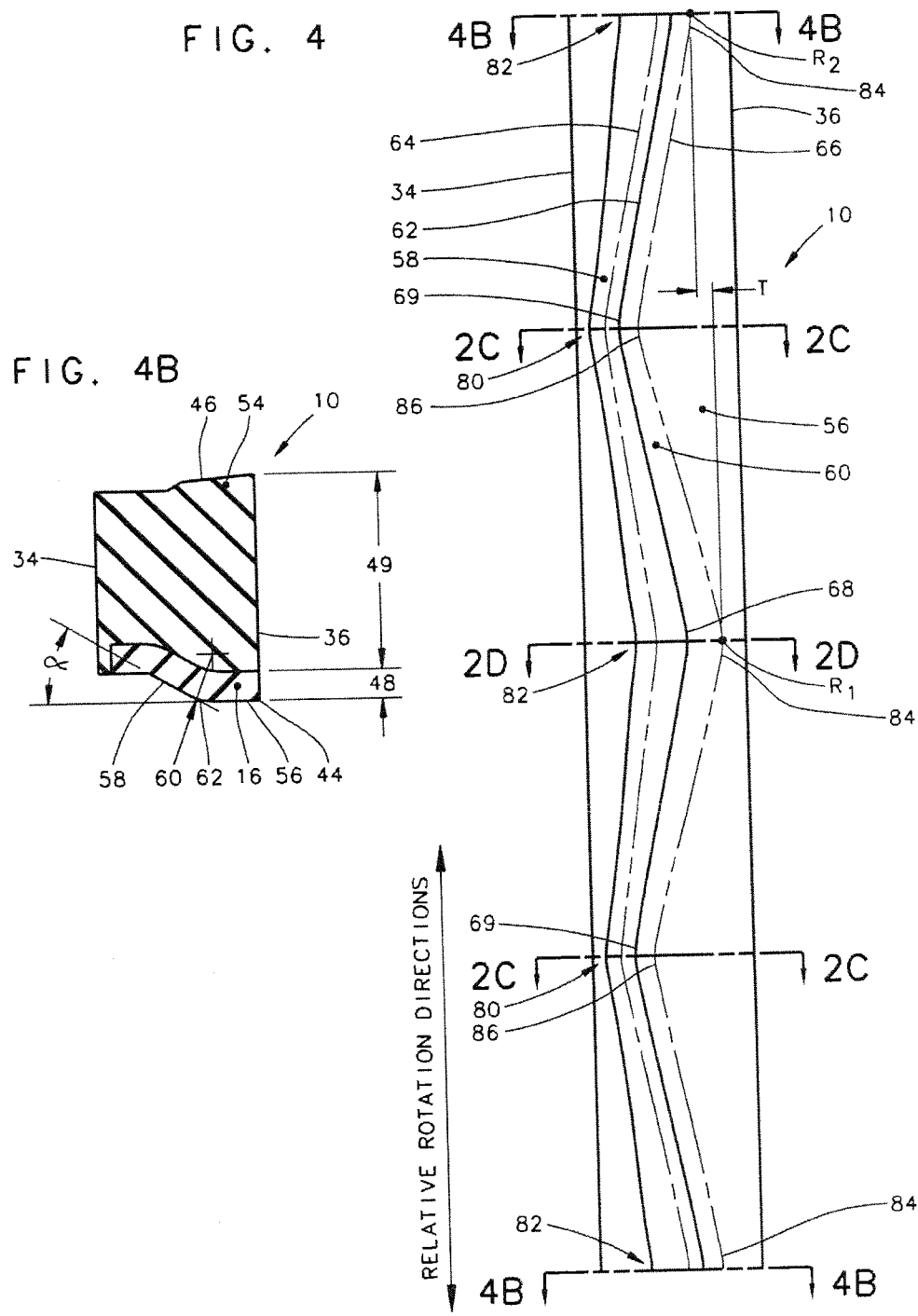

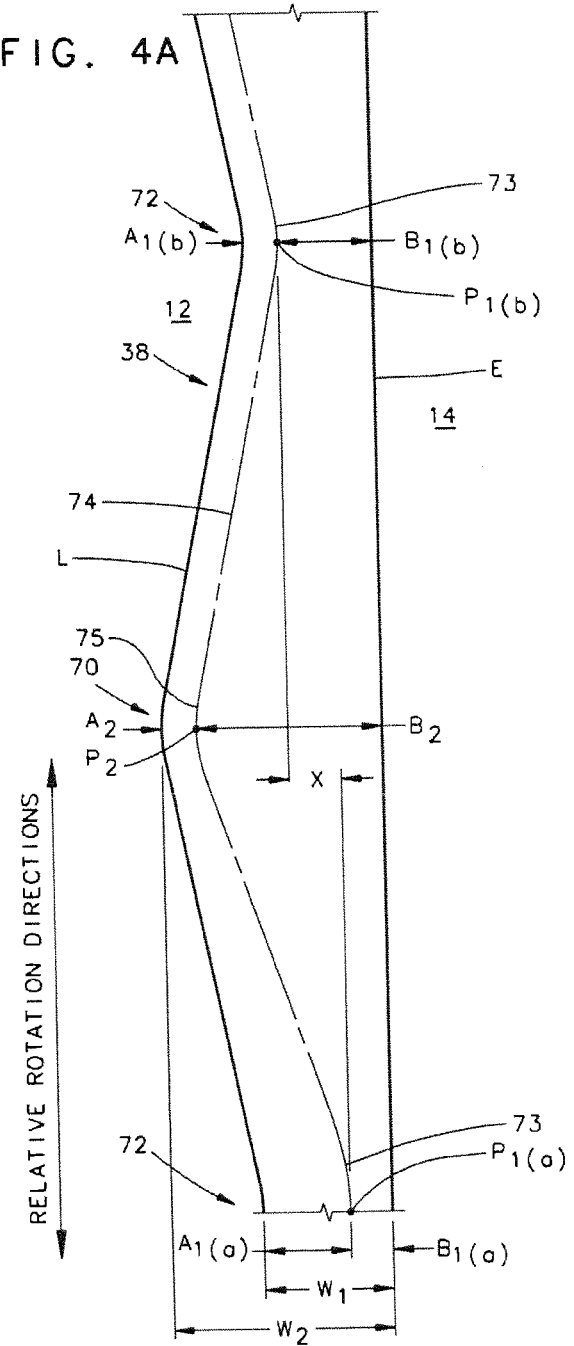

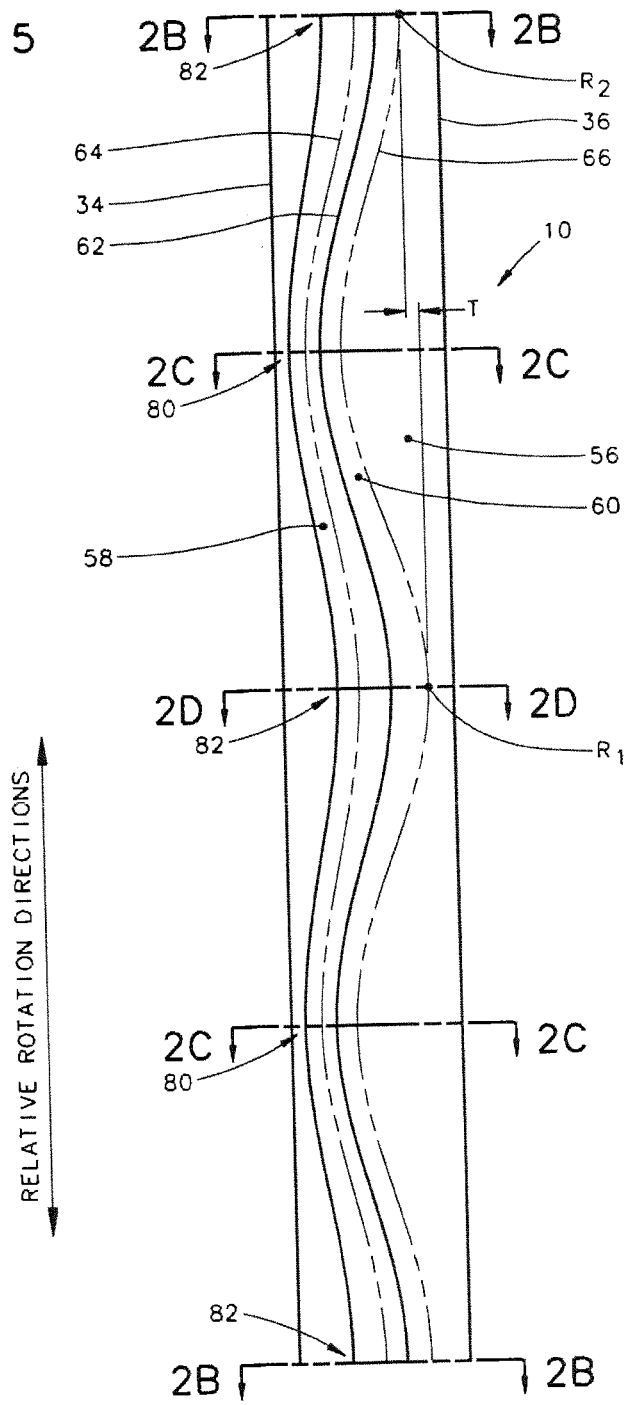

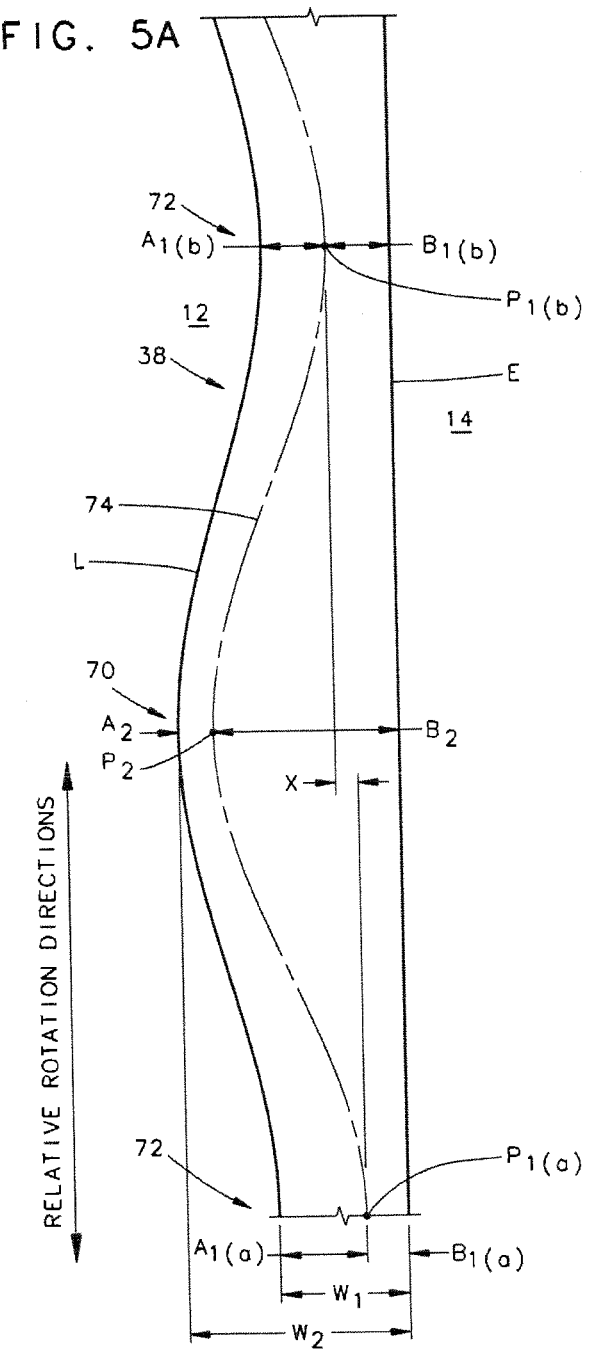

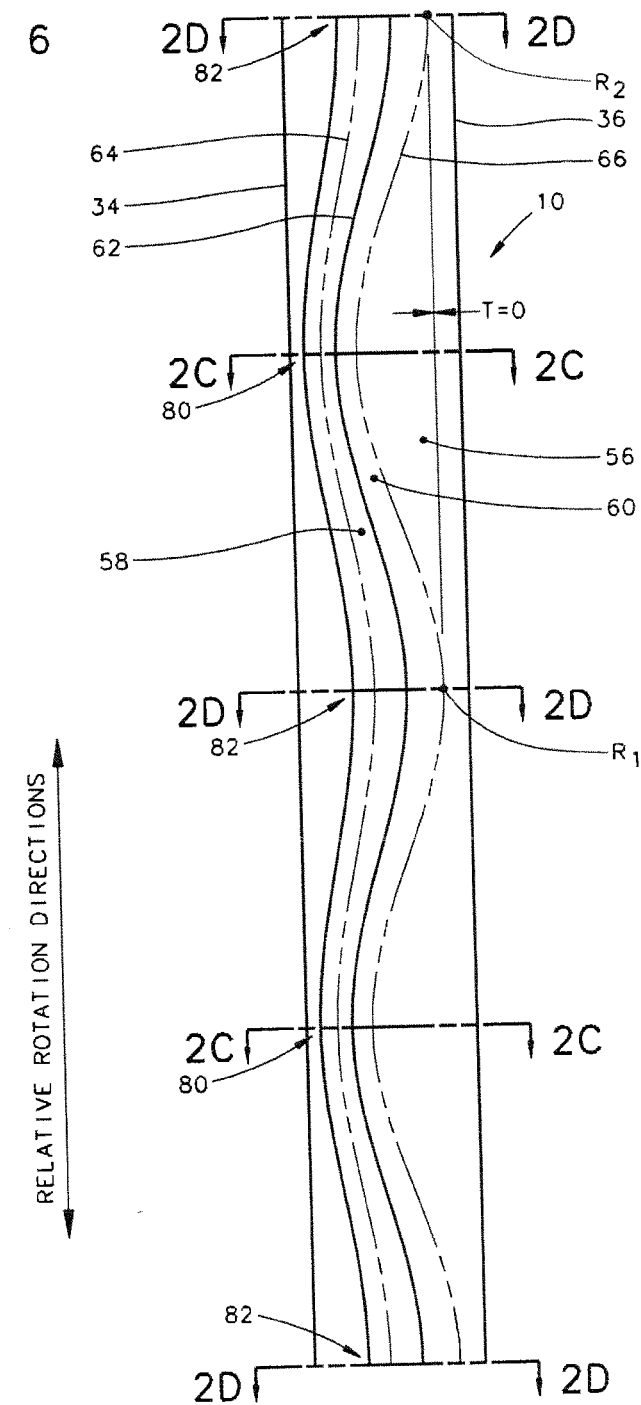

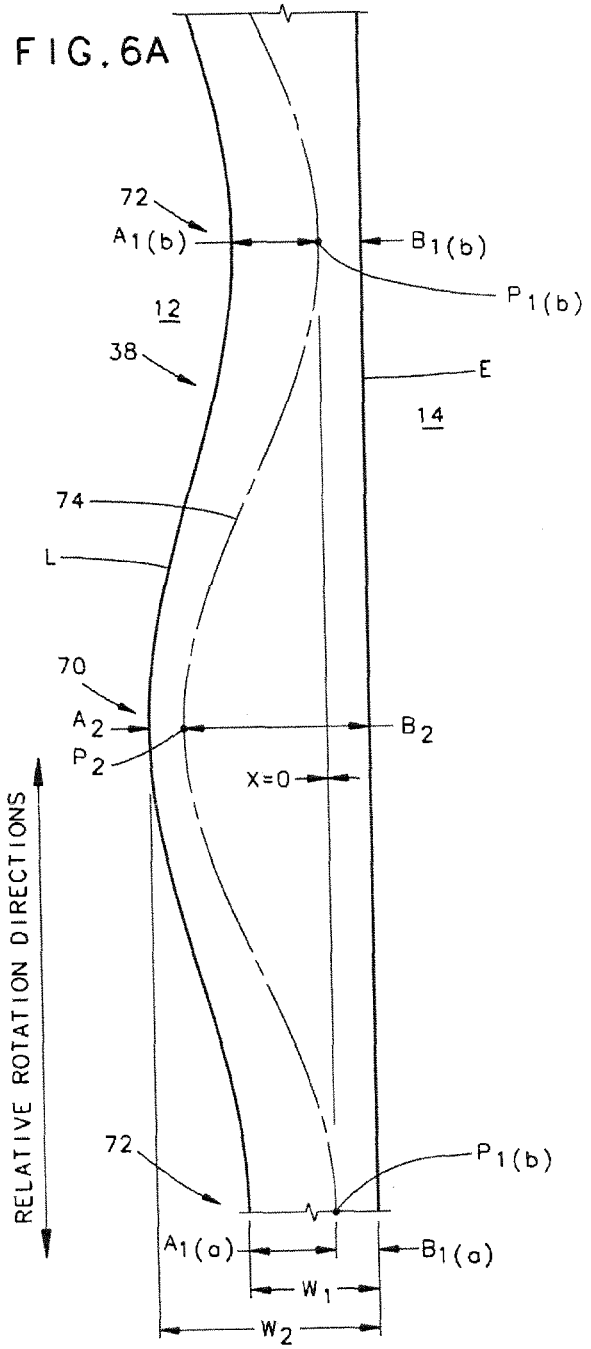

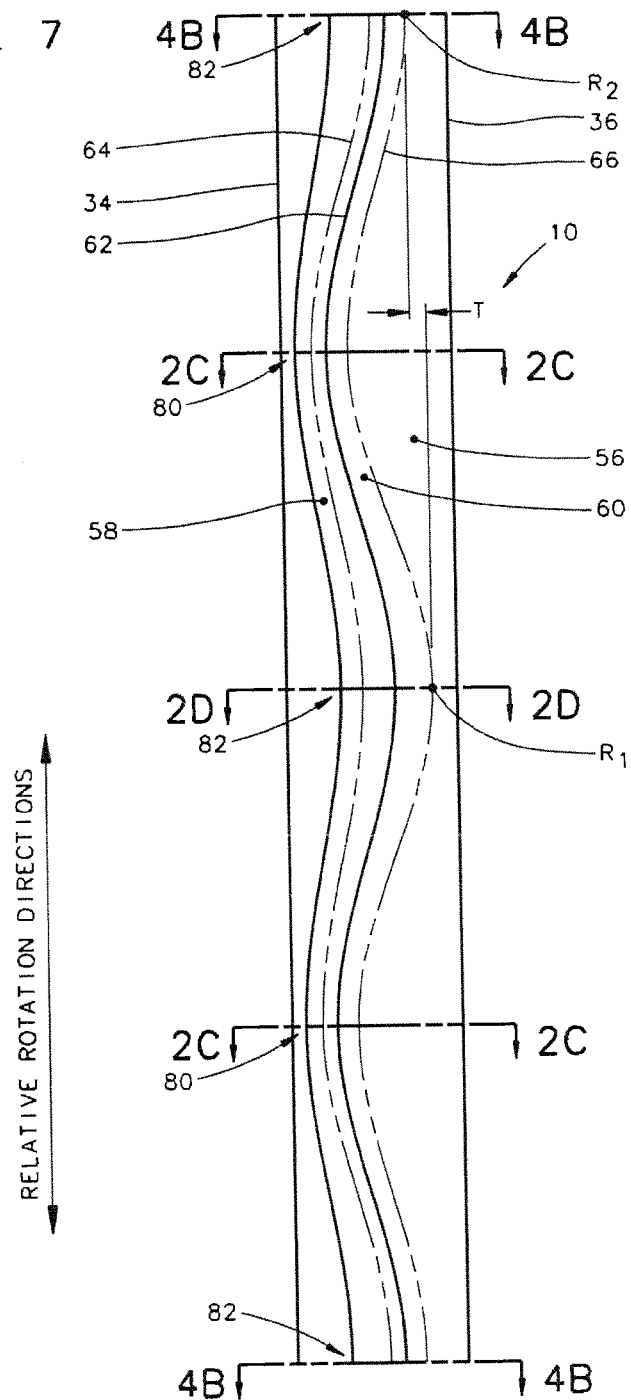

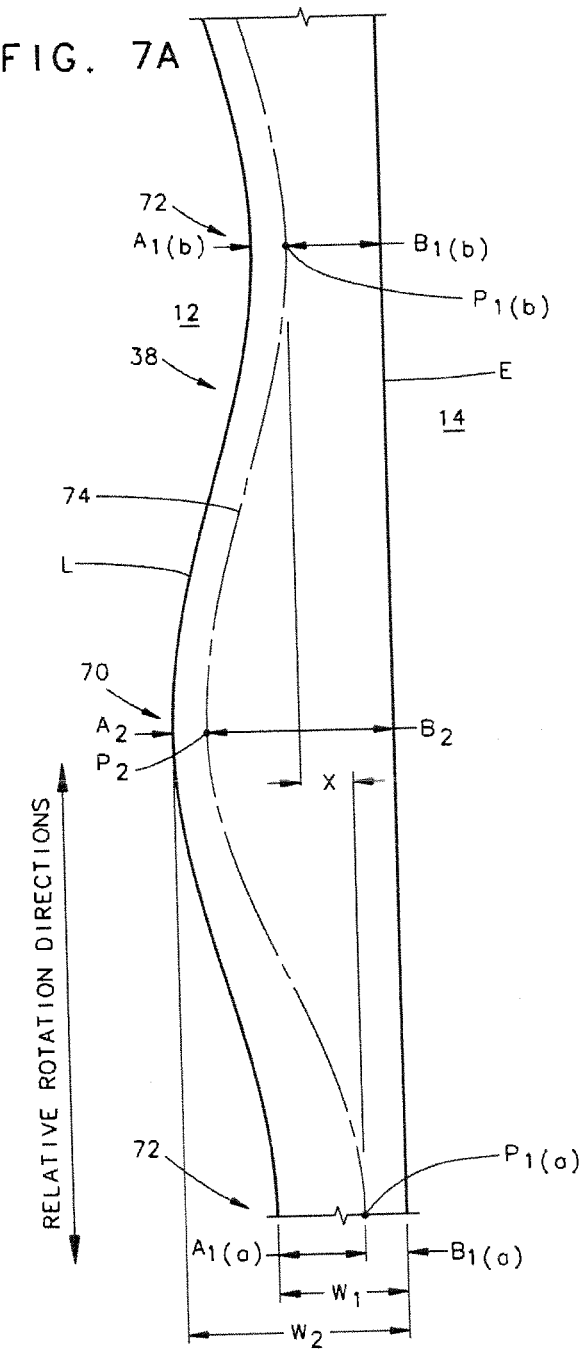

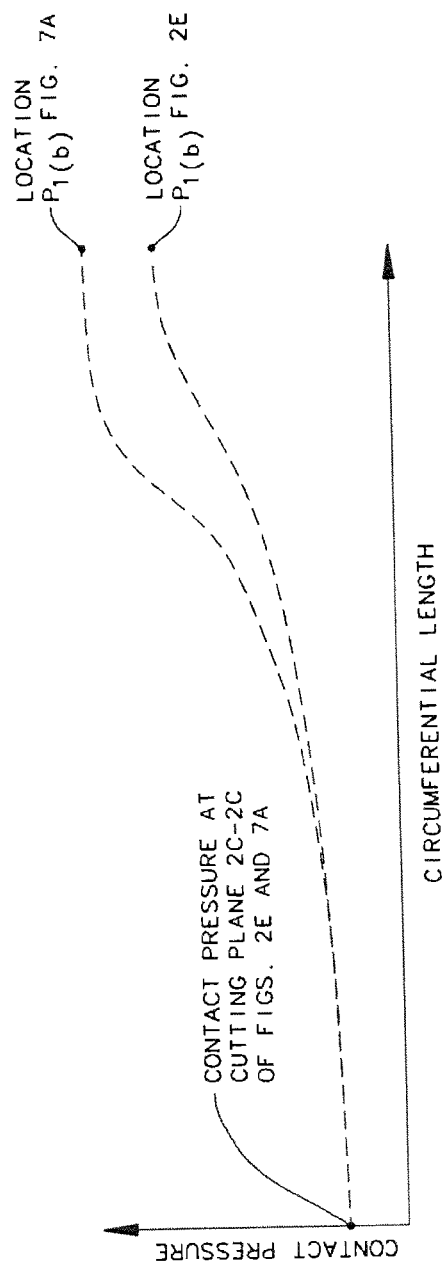

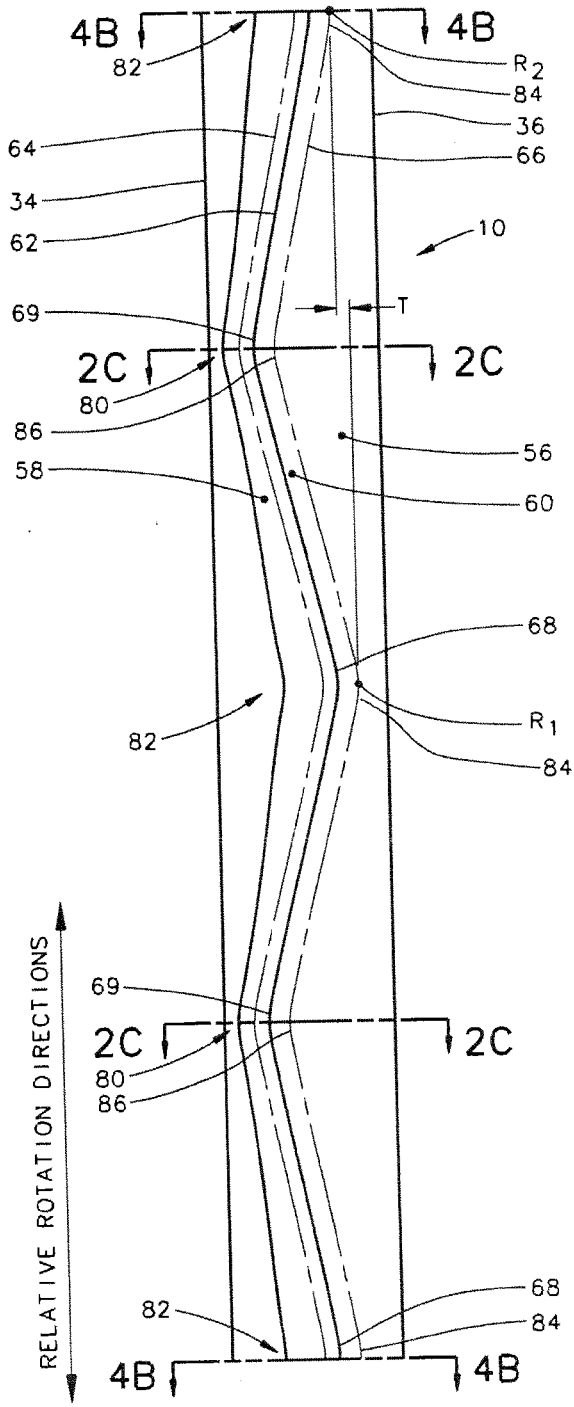

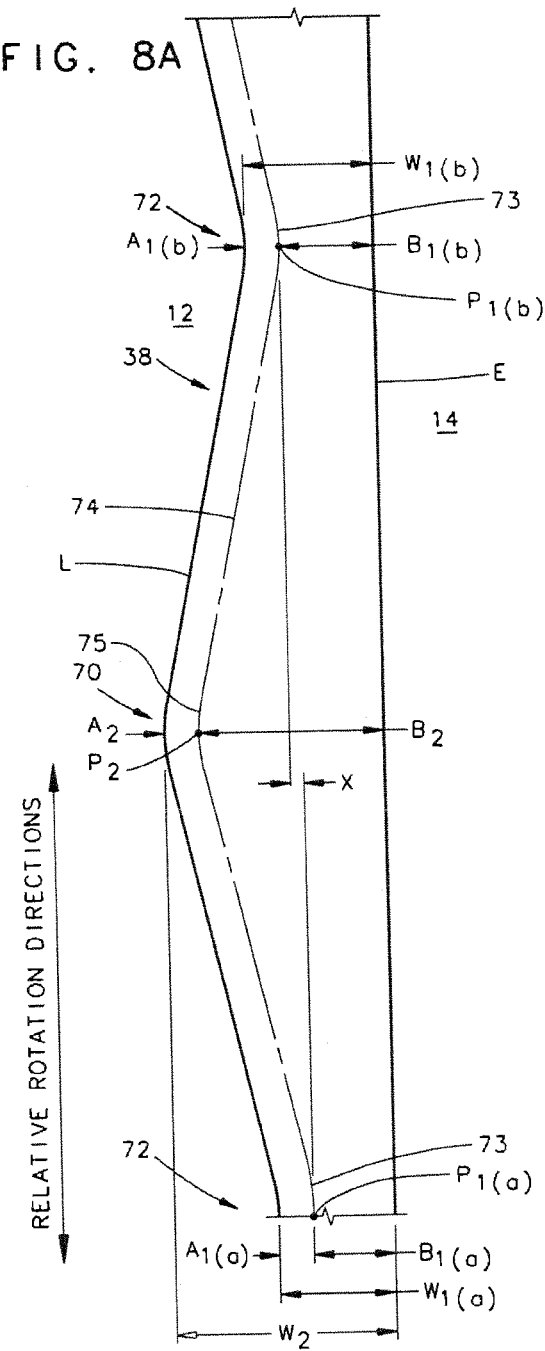

ROTARY SEAL WITH IMPROVED FILM DISTRIBUTION

CROSS-REFERENCE TO RELATED APPLICATIONS

This is a divisional of U.S. patent application Ser. No. 12/231,348 filed Sep. 2, 2008, which is a continuation-in-part of U.S. patent application Ser. No. 11/386,209 filed Mar. 22, 2006, now U.S. Pat. No. 7,562,878. Applicant claims the benefit of U.S. provisional application Ser. No. 60/967,174 filed Aug. 31, 2007, U.S. provisional application Ser. No. 60/999,957 filed Oct. 23, 2007, and U.S. provisional application Ser. No. 61/067,411 filed Feb. 28, 2008. Applicant incorporates by reference herein U.S. provisional application Ser. Nos. 60/967,174, 60/999,957 and 61/067,411 in their entirety.

STATEMENT REGARDING FEDERALLY SPONSORED RESEARCH OR DEVELOPMENT

This invention was made with United States government support under Contract No. DE-FG02-05ER84206 awarded by the Department of Energy. The United States government therefore has certain rights in this invention.

BACKGROUND OF THE INVENTION

1. Field of the Invention

This invention relates to hydrodynamic rotary seals for bi-directional rotation that are used to retain a lubricant and exclude an environment. More specifically, this invention relates to cooperative features that improve seal lubrication in conditions such as high operating temperature, skew-resisting confinement, high differential pressure, high initial compression, adverse tolerance accumulation, circumferential compression, high modulus seal materials, thin viscosity lubricants, third body seal surface wear, and/or material swell (collectively referred to as "severe operating conditions").

2. Description of the Related Art

Hydrodynamic seals used in down-hole oilfield tools are being challenged to operate at ever-greater temperatures and differential pressures. Such seals are installed with interference (i.e., compression) and establish sealing by blocking the leak path. For general examples of such seals, see FIG. 3 of U.S. Pat. No. 5,230,520, FIG. 4 of U.S. Pat. No. 6,315,302, and FIG. 6 of U.S. Pat. No. 6,382,634.

Upon installation in a compressed condition, hydrodynamic seals define a "footprint" representing the shape of the "dynamic sealing interface," and the two terms are generally interchangeable. Examples of footprints are shown in FIG. 2 of assignee's U.S. Pat. No. 4,610,319 and FIG. 13 of assignee's U.S. Pat. No. 5,230,520.

Smaller seal cross-sections are desirable because shaft and housing wall thickness can be maximized. Miniaturization impacts seal lubrication, as described in U.S. Pat. Appl. Pub. US2007/0205563, paras. [0036]-[0039]. For a given dimensional compression, interfacial contact pressure increases as a seal cross-section is miniaturized. With radial seals, circumferential compression increases as diameter is miniaturized, increasing footprint spread and contact pressure.

The skew-induced wear mechanism described and illustrated in FIG. 3-27 of the Kalsi Seals Handbook, Rev. 1 is addressed with skew-resisting confinement of the seal, which increases interfacial contact pressure and footprint spread. The term "skew-resisting confinement," as used herein, encompasses (1) constraint imposed by seal contact with fixed location gland walls as disclosed in U.S. Pat. No. 6,315,302, and (2) spring-loading through a moveable gland wall, as disclosed in FIG. 3-28 of the Kalsi Seals Handbook, Rev. 1.

Generally, the conventional wisdom regarding how such hydrodynamic seals lubricate has been described in U.S. Pat. No. 4,610,319 at col. 9, lines 6-22 and U.S. Pat. No. 5,230,520, col. 3, lines 30-53. In the '520 patent, FIG. 13 uses a curved arrow to illustrate the conventional wisdom that a normal velocity component $V_N$ urges the lubricant toward the environment. The emphasis on $V_N$ has caused undue focus on inlet efficiency over the years, and diverted attention from finding other potential lubrication factors. Such conventional wisdom of how these seals operate has been repeated in numerous other patents and commercial literature. See, for example, U.S. Pat. No. 5,678,829 (col. 4, lines 14-33), U.S. Pat. No. 5,738,358 (col. 2, lines 17-57), U.S. Pat. No. 5,873,576 (col. 2, lines 26-65), U.S. Pat. No. 6,036,192 (col. 2, lines 26-65), U.S. Pat. No. 6,120,036 (col. 2, lines 18-45), U.S. Pat. No. 6,227,547 (col. 11, lines 16-40), U.S. Pat. No. 6,315,302 (col. 10, lines 31-46), U.S. Pat. No. 6,334,619 (col. 1, line 57-col. 2, line 5), U.S. Pat. No. 6,382,634 (col. 11, lines 4-9), U.S. Pat. No. 6,685,194 (col. 4, lines 51-55), and U.S. Pat. No. 6,767,016 (col. 1, line 27-col. 2, line 16). Additionally, the conventional wisdom has been that the footprint wave height, per se, is important to lubrication. "Footprint wave height" as used herein refers to the difference in width between the widest and narrowest parts of the footprint.

The use of the aforementioned conventional wisdom (relating to $V_N$ and footprint wave height) is inadequate in designing highly effective hydrodynamic rotary seals for use in severe operating conditions. The use of the conventional wisdom in the design of seals for severe operating conditions has resulted in limited seal effectiveness.

Another bit of the conventional wisdom pertaining to hydrodynamic rotary seals is related to physical hydrodynamic inlet convergence. A general (and correct) tenant is that more gradual convergence produces more efficient in-pumping. U.S. Pat. Nos. 6,315,302, 6,382,634 and 6,685,194 teach the use of gradual convergences. Experience has shown that despite their inlet efficiency, such seals lubricate sub-optimally because their designs are based on the conventional wisdom pertaining to footprint wave height and $V_N$.

U.S. Pat. No. 6,109,618 teaches the use of abrupt trailing edge geometries, that are unsuitable as hydrodynamic inlets, on seals suitable only for uni-directional rotation. This abrupt geometry is on the trailing edges of the waves, and is coupled with a very gently converging inlet geometry on the leading edges. Due to the high hydrodynamic leakage of such geometry, and the small reservoir size of downhole tools, downhole seals cannot employ such geometries.

The prior art seals are constructed from elastomers which suffer accelerated degradation at elevated temperature. For example, media resistance problems, gas permeation, swelling, compression set, and pressure related extrusion damage all become worse at elevated temperature. A bi-directional rotation seal that operates with less torque and produces less seal-generated heat would be desirable, in order to moderate such degradation.

Circumferential slippage of a seal with respect to its groove occurs more often with large diameter seals because the moment arms between the static and dynamic sealing interfaces are more nearly equal, and the static sealing interface has less mechanical advantage. Rotational slippage is particularly undesirable in large diameter seals because the slippage can vary around the circumference of the seal, causing undesirable localized stretching. It is also undesirable in seals exposed to high differential pressure because slippage can accelerate seal extrusion damage. Slippage is exacerbated by seal or shaft wear because such wear increases running torque. A bi-directional seal that has lower running torque and more resistance to wear is therefore desirable.

It is desirable to overcome the aforementioned limitations of prior art seals.

SUMMARY OF THE INVENTION

The present invention relates to generally circular rotary seals that are suitable for bi-directional rotation, and overcome the aforementioned prior art problems. The seals are used to establish sealing between a machine component (such as a housing) and a relatively rotatable surface (such as a shaft), in order to separate a lubricating media from an environment. Seal geometry on a dynamic lip interacts with the lubricating media during relative rotation to wedge a lubricating film into the dynamic sealing interface between the seal and the relatively rotatable surface. A portion of the lubricating film migrates toward, and into the environment and thus provides a contaminant flushing action.

The rotary seal includes a dynamic lip that deforms when compressed into sealing engagement with the relatively rotatable surface, defining a hydrodynamic wedging angle with respect to the relatively rotatable surface, and defining an interfacial contact footprint of generally circular configuration but varying in width. A non-circular (i.e., wavy) footprint edge hydrodynamically wedges the lubricating film into the interfacial contact footprint.

One aspect of a preferred embodiment of the present invention involves a newly established variable referred to as $E_{WH}$. $E_{WH}$ is used herein for a dimension that represents the difference in size between Dimension $B_2$ and Width $W_1$ in which Dimension $B_2$ is the dimension from a second footprint edge to a location $P_2$ defining the maximum interfacial contact pressure at the widest footprint location and Width $W_1$ is the footprint width at the narrowest footprint location. In other words, the value of $E_{WH}$ is calculated as Dimension $B_2$ minus the Width $W_1$, and the result may be a positive or negative number, depending on the circumstances.

It has now been discovered that in the aforementioned cases described in the Background, the lubrication problem occurs because the value of $E_{WH}$ approaches zero or becomes negative—a circumstance not contemplated under the conventional wisdom because $E_{WH}$ and its import were unknown. As seal temperature increases, lubrication decreases as the value of $E_{WH}$ decreases. As lubrication decreases, the seal generates more and more heat due to increasing asperity friction, causing a loss of lubricant film viscosity. These factors further increase seal temperature, compounding the problem and leading to an unsustainable runaway operating condition. Thus, in one embodiment of the rotary seal of the present invention the value of $E_{WH}$ is maintained positive.

Another embodiment of the present invention is a generally circular, hydrodynamically lubricating rotary seal that accomplishes improved lubrication through the cooperative benefits of a modified zig-zag wave pattern, a variably sized inlet curvature that is a tighter curvature near the widest parts of the dynamic lip, and a less tight curvature near the narrower portions of the dynamic lip, and a dynamic lip flank that is more steeply sloped near the widest parts of the dynamic lip, and less steep near the narrower parts of the dynamic lip.

The modified zig-zag wave pattern improves interfacial contact pressure gradients and the orientation and/or location of the pressure gradients in critical locations. The variable radius controls the magnitude of the pressure at a critical location, and provides improved inlet convergence, while enhancing factors that contribute to lubrication in severe operating conditions. The variable slope of the dynamic lip flank provides a number of benefits related to a variety of seal performance issues, the most important of which is to minimize seal volume for improved compatibility with skew-resisting confinement.

The seal preferably provides a dynamic exclusionary intersection of abrupt substantially circular form that provides the interfacial contact footprint with an environment edge that resists environmental intrusion. The seal can be configured for dynamic sealing against a shaft, a bore, or a face. Simplified embodiments are possible wherein one or more features of the preferred embodiment are omitted.

One objective of this invention is to provide a hydrodynamic rotary seal having low torque for reduced wear and heat generation. Another objective of an embodiment is improved distribution of lubricant across the dynamic sealing interface, particularly at high operating temperatures. Another objective of yet another embodiment is to conserve void volume within the seal gland, to provide adequate room for seal thermal expansion, considering seal tolerances and as-manufactured variations in the coefficient of thermal expansion of the sealing material, with a view toward improved accommodation of skew-resisting confinement.

BRIEF DESCRIPTION OF THE SEVERAL VIEWS OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings. It is to be noted, however, that the appended drawings only illustrate preferred embodiments of this invention, and are therefore not to be considered limiting of its scope, for the invention may admit to other equally effective embodiments that vary only in detail.

In the drawings:

FIG. 2A is a fragmentary view of the hydrodynamic seal of FIG. 2 in an uncompressed condition;

FIG. 2B is a section view taken along line 2B-2B of FIGS. 2A and 5;

FIG. 2C is a section view taken along line 2C-2C of FIGS. 2A, 3, 4, 5, 6, 7 and 8;

FIG. 2D is a section view taken along line 2D-2D of FIGS. 2A, 3, 4, 5, 6 and 7;

FIG. 3 is a fragmentary view of a hydrodynamic seal according to another preferred embodiment of the present invention, the seal in an uncompressed condition;

FIG. 3A is a fragmentary illustration of the interfacial contact footprint of the hydrodynamic seal of FIG. 3;

FIG. 4 is a fragmentary view of a hydrodynamic seal according to another preferred embodiment of the present invention, the seal in an uncompressed condition;

FIG. 4A is a fragmentary illustration of the interfacial contact footprint of the hydrodynamic seal of FIG. 4;

FIG. 4B is a section view taken along line 4B-4B of FIGS. 4, 7 and 8;

FIG. 5 is a fragmentary view of a hydrodynamic seal according to another preferred embodiment of the present invention, the seal in an uncompressed condition;

FIG. 5A is a fragmentary illustration of the interfacial contact footprint of the hydrodynamic seal of FIG. 5;

FIG. 6 is a fragmentary view of a hydrodynamic seal according to another preferred embodiment of the present invention, the seal in an uncompressed condition;

FIG. 6A is a fragmentary illustration of the interfacial contact footprint of the hydrodynamic seal of FIG. 6;

FIG. 7 is a fragmentary view of a hydrodynamic seal according to another preferred embodiment of the present invention, the seal in an uncompressed condition;

FIG. 7A is a fragmentary illustration of the interfacial contact footprint of the hydrodynamic seal of FIG. 7;

FIG. 7B is a graph representing the interfacial contact pressures at selected circumferential slices of the hydrodynamic rotary seal of FIGS. 2A and 7;

FIG. 8 is a fragmentary view of a hydrodynamic seal according to another preferred embodiment of the present invention, the seal in an uncompressed condition;

FIG. 8A is a fragmentary illustration of the interfacial contact footprint of the hydrodynamic seal of FIG. 8;

DESCRIPTION OF THE PREFERRED EMBODIMENTS

1. Description of FIG. 1

Figure 1:
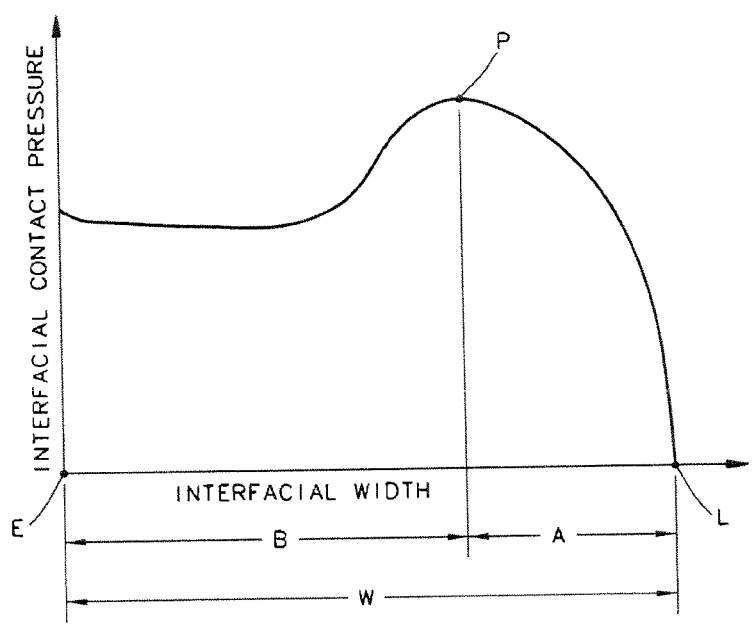
FIG. 1 is a graph schematically representing a typical interfacial contact pressure plot at a circumferential location of a hydrodynamic seal.

FIG. 1 is a graph that schematically represents an interfacial contact pressure plot at any circumferential location of a typical seal, for example, manufactured according to one of assignee's U.S. Pat. Nos. 4,610,319, 5,230,520, 6,315,302, 6,382,634, and so forth. The proportions of a contact pressure plot will vary depending on specific seal geometry and analysis constraints, but the general plot characteristics are captured in FIG. 1. The plot has a first footprint edge L and second footprint edge E, which correspond to the lubricant-side and environment-side edges, respectively, of the dynamic sealing interface/footprint. The direction of relative rotation between the seal and the mating relatively rotatable surface is normal (perpendicular) to the axis labeled "interfacial width", and normal (perpendicular) to the page on which the figure is printed.

At any given circumferential location of the footprint, the inlet contact pressure rises from zero at the first footprint edge L to a maximum at Location P. Location P is remote from the first footprint edge L by Dimension A, and is remote from the second footprint edge E by Dimension B. Width W represents the local width of the dynamic sealing interface/footprint. In the text that follows, these labels and dimensions (i.e., first footprint edge L, second footprint edge E, Location P, Dimension A, Dimension B and Width W) are, when necessary, given a subscript "1" or "2" to refer to the narrowest or the widest footprint location, respectively.

The aforementioned labels and dimensions are used not only in describing FIG. 1, but are also used elsewhere in this "Description of the Preferred Embodiments," in order to facilitate communication via the use of consistent terminology. In certain figures, the aforementioned subscript "1" is, when necessary, modified by the addition of an "a" or "b" to designate specific locations on multiple wave footprint illustrations.

The footprint edge represented by second footprint edge E is substantially circular. Width W varies about the circumference of the seal from a narrowest location defined by Width $W_1$ to a widest location defined by Width $W_2$. In assignee's commercial variants suitable for bi-directional rotation, the variation of Width W has been sinusoidal. $E_{WH}$ is a newly established variable that is used herein for a dimension that represents the difference in size between Dimension $B_2$ and Width $W_1$. In other words, the value of $E_{WH}$ is calculated as Dimension $B_2$ minus the Width $W_1$, and the result may be a positive or negative number, depending on the circumstances.

With seals constructed in accordance with U.S. Pat. Nos. 4,610,319, 5,230,520, 5,738,358, 6,120,036, 6,315,302, 6,382,634, and so forth, the interfacial contact pressure increases from Location $P_2$ to Location $P_1$, creating a zone of elevated interfacial contact pressure near Location $P_1$. With the conventional sinusoidal variation of Width W, this zone has a generally circumferential orientation for a significant distance.

The lubricant film thickness is uneven across the Width W of the dynamic interface, and surface asperity contact sometimes occurs. For example, a portion of the footprint that is circumferentially aligned with Width $W_1$ suffers film disruption due to the aforementioned circumferential contact pressure zone orientation, the sheer magnitude of contact pressure near Location $P_1$, and due to unfavorable contact pressure gradients.

FIG. 5 of U.S. Pat. No. 4,610,319 shows a wave pattern that addresses the aforementioned generally circumferential contact pressure zone orientation, but it does not address the zone of elevated contact pressure near Location $P_1$. If the teachings of FIG. 5 of the '319 patent are followed, the waves will have undesirable facets at the widest and narrowest parts of the dynamic lip.

FIGS. 2A, 2B, 2C, 2F and 9 of U.S. Pat. No. 6,109,618 teach the use of a similar wave for uni-directional rotation. These figures fail to address lubricating problems in the vicinity of Location $P_1$. The narrowest part of the dynamic lip is dominated by an abrupt restrictive diverter 250. In FIGS. 2A and 2E of the '618 patent, the abrupt restrictive diverter 250 is in the form of a corner/facet between dynamic sealing surface 226 and wavy lubricant-side 230 of circular dynamic sealing lip 224, and in FIG. 9 the abrupt restrictive diverter 250 is in the form of a sharp projection. The abrupt restrictive diverter 250 causes contact pressure to skyrocket at the narrowest parts of the dynamic lip, making problems worse. The salient issues were clearly missed because the contact pressure zone 262 in FIG. 2F does not extend to Location $P_1$, and the illustrated edge of the zone is circumferentially oriented at the narrowest points of the footprint. The footprint edge radii at the narrowest parts of the footprint are large—indicating that any corresponding seal fillets are much larger than needed to eliminate the surface facets inherent to FIG. 5 of U.S. Pat. No. 4,610,319.

It is desirable for a seal to be suitable for bi-directional rotation, and to address the prior art problems associated with the zone of elevated contact pressure near Location $P_1$, particularly if the circumferential orientation of the zone could be minimized and its film thickness could be increased.

U.S. Pat. Nos. 6,109,618 and 6,685,194 teach different ways of implementing a variable inlet curvature on the leading edge of a uni-directional hydrodynamic wave. Both patents teach the use of a curvature that is most abrupt at the narrowest parts of the dynamic lip (for example, see FIGS. 2 to 2E of the '618 patent, and FIGS. 4 to 4C, 5A, 7, 8, 8A, 9 and 9A of the '194 patent). Because the inlet is more abrupt at the narrowest parts of the dynamic lip, it exacerbates contact pressure issues near Location $P_1$.

Highly saturated nitrile ("HSN") seals made and employed in accordance with U.S. Pat. No. 6,315,302 suffer from under-lubrication at higher temperatures that are within the generally understood operating temperature limits of the elastomer (the 250° F. temperature stated in the '302 patent at col. 11, line 65 through col. 12, line 2 is well within the generally understood operating limits of the elastomer). With tetrafluoroethylene and propylene copolymer-flurocarbon rubber ("TFE/P-FKM") composite seals made in accordance with U.S. Pat. Appl. Pub. 2006/0214379, lubrication also suffers at high temperatures that are within the generally understood operating temperature limits of the elastomer compounds. This problem is exacerbated when such seals are used with the recommended aforementioned spring-loading.

It has now been discovered that in both of the aforementioned cases, the lubrication problem occurs because the value of $E_{WH}$ approaches zero or becomes negative—a circumstance not contemplated under the conventional wisdom because $E_{WH}$ and its import were unknown. As seal temperature increases, lubrication decreases as the value of $E_{WH}$ decreases. As lubrication decreases, the seal generates more and more heat due to increasing asperity friction, causing a loss of lubricant film viscosity. These factors further increase seal temperature, compounding the problem and leading to an unsustainable runaway operating condition.

These issues are a result of design decisions made on the basis of the conventional wisdom pertaining to footprint wave height and $V_N$. Lubrication breaks down even though, under the conventional wisdom, the remaining footprint wave height is quite satisfactory.

Elastomers have a high coefficient of thermal expansion. Because there is more material at the widest parts of the dynamic lip, part of the differential thermal expansion between the seal and the housing is relieved circumferentially, causing material displacement from the widest to the narrowest parts of the dynamic lip, thereby increasing Width $W_1$ relative to Dimension $B_2$.

Even if the circumferential transfer of thermally expanded material had been understood, it would not have raised alarm unless the footprint wave height (Width $W_2$–Width $W_1$) was significantly compromised, because moderate footprint wave height loss would not violate the conventional wisdom concerning the theory of operation. As part of the present invention resulting from considerable study, applicant now understands that lubrication can be seriously impaired even though significant footprint wave height remains, due to the differential growth of Width $W_1$ relative to Dimension $B_2$.

As used herein, the term "un-swept zone" refers to that portion of the footprint that is circumferentially aligned with Width $W_1$, and the term "swept zone" refers to all the other area of the footprint. In other words the swept zone is that portion of the footprint that is circumferentially aligned with the footprint wave height. The swept zone is directly lubricated by the sweep of the First Footprint Edge L across the lubricant-wetted shaft.

When the pressure of the environment is greater than that of the lubricant, such as during down-hole swab events, the first footprint edge $L_1$ is displaced toward the lubricant more than Location $P_2$, owing to significant variations in the stiffness of the prior art dynamic lip. This impairs lubrication due to an effect that parallels the situation when the value of $E_{WH}$ approaches or equals zero, or becomes negative.

Although the "gentle" seal to shaft convergence taught by U.S. Pat. Nos. 6,315,302, 6,382,634 and 6,685,194 is very effective in terms of hydrodynamic in-pumping, and in terms of reducing interfacial contact pressure near Location $P_1$, such designs significantly increase Dimension $A_2$ at the expense of Dimension $B_2$. According to the conventional wisdom, this approach is unequivocally beneficial. With such seals, the value of $E_{WH}$ approaches or equals zero, or becomes negative, especially in severe operating conditions.

FIG. 13 of U.S. Pat. No. 6,109,618 shows how pervasive the conventional wisdom concerning a gentle inlet convergence has been. A seal intended for bi-directional rotation is shown where the inlet geometry produces extremely effective in-pumping by virtue of gentle convergence with the shaft, but unfortunately another gentle convergence allows the lubricant film to escape at the trailing edge of the wave. FIG. 13 also demonstrates a lack of understanding of the problems that circumferentially-oriented contact zones cause. As shown by the dashed line representation of the tangency location, the seal of FIG. 13 has circumferentially-oriented zones of contact pressure that extend over most of the circumference of the seal. Furthermore, the contact pressure within these zones is relatively high because of the abrupt nature of the lip flank curvature, as shown in the section views of FIGS. 13A and 13B.

Figure 2:
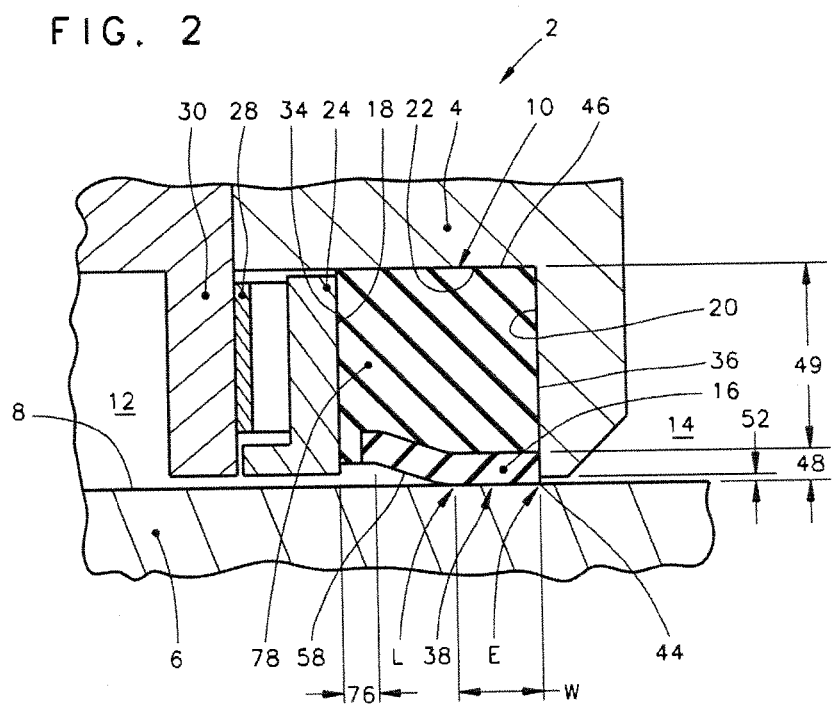
FIG. 2 is a fragmentary cross-sectional view of a ring-shaped hydrodynamic seal according to a preferred embodiment of the present invention, the seal shown in an installed, compressed condition.
Figure 2E:
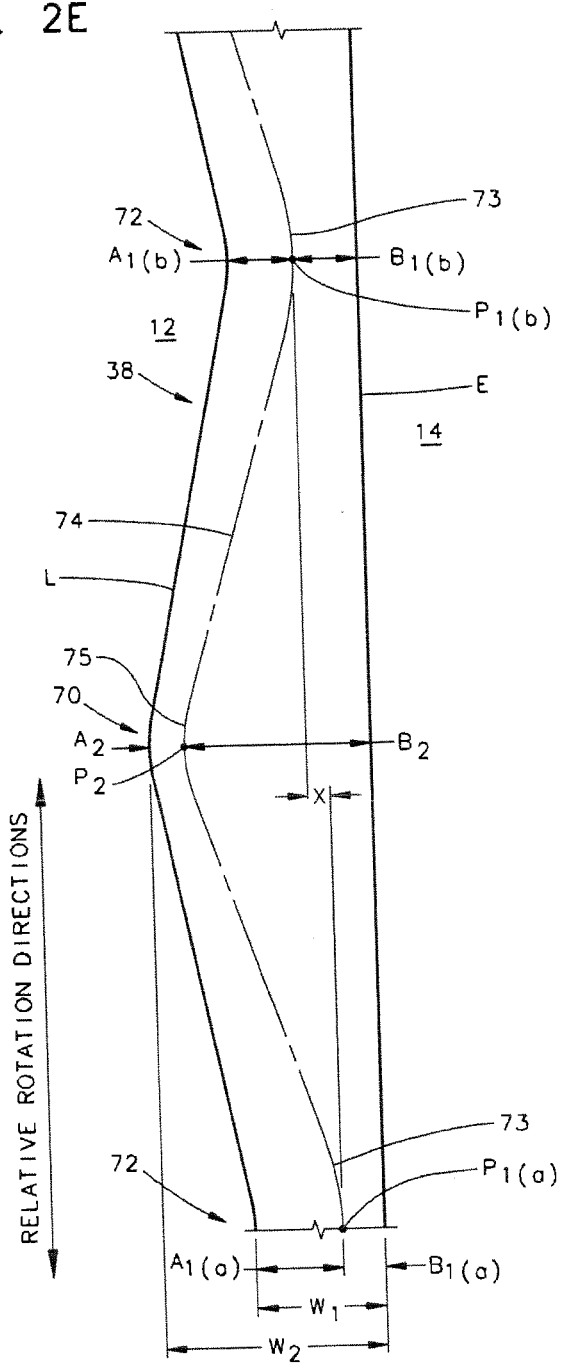
FIG. 2E is a fragmentary illustration of the interfacial contact footprint of the hydrodynamic seal of FIG. 2.

FIGS. 2 and 3 of U.S. Pat. No. 6,315,302 and the related discussion in lines 50-59 of col. 18 thereof, and FIGS. 3 and 4 of U.S. Pat. No. 6,382,634 and the related discussion in lines 27-33 of col. 14 and col. 14, line 43 through col. 15, line 18 thereof, and col. 2, lines 49-56, col. 4, lines 51-61, col. 6, lines 31-35 and col. 11, lines 33-39 of U.S. Pat. No. 6,685,194 also demonstrate how pervasive the conventional wisdom has been, in relation to achieving a gentle inlet convergence that was believed, in conjunction with $V_N$, to create an ideal situation for lubricating the interfacial contact footprint. Such geometries were eventually found to suffer from under-lubrication in severe service conditions. After years of research, the cause has recently been determined to be the result of the value of $E_{WH}$ approaching or equaling zero, or becoming negative.

U.S. Pat. No. 6,685,194 exemplifies the blind adherence to conventional wisdom, to the exclusion of the then-unknown importance of the numeric value of $E_{WH}$. For example, in the variable radius examples of FIGS. 4, 4A and 4B, Location $P_2$ would coincide with the circular exclusion edge, so the size of Dimension $B_2$ is zero. Even though the footprints of these seals have generous footprint wave height, as signified by the dashed lines, the value of $E_{WH}$ is always less than zero, even at room temperature. Such seals only lubricate in low differential pressure conditions. The lubrication is due to secondary factors such as side leakage from the swept zone (related to the fact that film thickness tends to decay gradually, rather than abruptly, due to the relative stiffness of the seal material; see Abstract, U.S. Pat. No. 6,109,618), and such as macro-lubrication from surface finish affects.

It is a significant undesirable characteristic of the prior art bi-directional rotation seals that lubrication of the un-swept zone is impaired in severe operating conditions. In some of the prior art, the value of $E_{WH}$ is always less than zero, even at room temperature. Even in the best of the prior art, $E_{WH}$ is undesirably small at room temperature, and becomes compromised in severe operating conditions that include skew-resisting confinement.

In the prior art, each molded wave is substantially identical, which means that all instances of Dimension $B_1$ are substantially identical. This means that each of the film disturbances at and/or near any Location $P_1$ lies in the poorly lubricated wake of a similar disturbance from the preceding wave. This compounds the problem by extending the disturbance circumferentially. The various aforementioned factors cooperate to thin the film in the un-swept zone. The resulting seal-generated heat exacerbates the aforementioned increase in the size of Width $W_1$.

U.S. Pat. No. 6,315,302 entitled "Skew Resisting Hydrodynamic Seal," teaches conservation of void volume to accommodate skew-resisting confinement. From a void volume conservation standpoint, it is desirable to avoid the condition shown in FIGS. 2A and 6 of U.S. Pat. No. 6,382,634 and FIG. 11 of U.S. Pat. No. 5,230,520, where the lubricant side flank is truncated by the lubricant end of the seal at the widest part of the dynamic lip, leaving very little void volume near that location. Likewise, it is desirable to avoid the condition shown in FIGS. 4-4C of U.S. Pat. No. 6,315,302, where the lubricant side flank of the dynamic lip extends to the lubricant end of the seal. These examples are not only undesirable from an interfacial contact standpoint when the seal is installed in skew-resisting confinement, but it also negatively impacts mold design.

In the prior art radial seals, the initial compression also causes circumferential compression, which is increased by thermal expansion. Since the seal circumference is relatively long compared to the seal cross-section, circumferential compression can cause buckling in a manner similar to the classic textbook example of a long, slender structural column under compressive loading. This buckling tendency is augmented by the variable stiffness of the prior art seal about its circumference that is caused by the varying dynamic lip width.

This buckling tendency is significantly worse in high temperature seals, such as those manufactured in accordance with FIG. 2 of U.S. Pat. Appl. Pub. US2006/0214379, because of the great amount of circumferential compression caused by seal thermal expansion at high temperature. Consequently, more spring loading is needed to prevent such buckling, and this spring loading further decreases the value of $E_{WH}$ by increasing Width $W_1$, to the detriment of lubrication.

2. Description of the Seal of FIGS. 2-2E

FIGS. 2-2E represent a preferred embodiment of the present invention. These figures should be studied together to best understand the preferred embodiment. Features throughout this specification that are represented by like numbers have the same function.

FIG. 2 is a fragmentary cross-sectional view that provides a general overview of how a preferred embodiment of the present invention may be employed when assembled into a machine that is shown generally at 2. The machine 2 includes a first machine component 4 and a second machine component 6 that defines a relatively rotatable surface 8. The first machine component 4 and the second machine component 6 together typically define at least a portion of a chamber for locating a first fluid 12.

A rotary seal, shown generally at 10, establishes sealing engagement with the relatively rotatable surface 8, to retain the first fluid 12, to partition the first fluid 12 from a second fluid 14, and typically to exclude the second fluid 14. For the purposes of this specification, the term "fluid" has its broadest meaning, encompassing both liquids and gases. The first fluid 12 is preferably a liquid-type lubricant such as a synthetic or natural oil, although other fluids are also suitable in some applications. The second fluid 14 may be any type of environment that the rotary seal 10 may be exposed to in service, such as any type of liquid or gaseous environment including, but not limited to, a lubricating media, a process media, a drilling fluid, an atmosphere, seawater, a partial vacuum, etc.

The rotary seal 10 is of generally circular, ring-like configuration and includes at least one dynamic lip 16 that is also generally circular in form, and is disposed in facing relation to the relatively rotatable surface 8. In the cross-sectional views herein, the cutting plane of the cross-section is aligned with and passes through the theoretical axis/centerline of the rotary seal 10; i.e., the theoretical axis lies on the cutting plane.

When exclusion of the second fluid 14 is desired, the dynamic lip 16 preferably incorporates a dynamic exclusionary intersection 44 (sometimes called the "exclusion edge") of abrupt substantially circular form that is substantially aligned with the direction of relative rotation, and is adapted to exclude the second fluid 14, as taught by U.S. Pat. No. 4,610,319. Although truly perfect circularity is desirable, it is seldom, if ever, obtainable in any feature of any manufactured product in actual practice, hence the terminology "substantially circular form." The dynamic exclusionary intersection 44 develops substantially no hydrodynamic wedging activity during relative rotation, and presents a scraping edge to exclude the second fluid 14 in the event of relative motion that is perpendicular to the direction of relative rotation.

Figure 9:
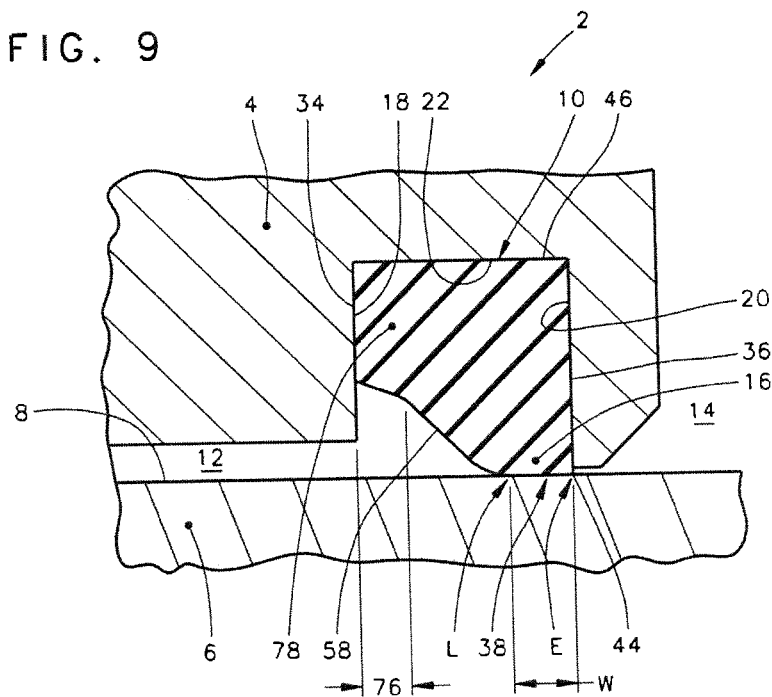
FIG. 9 is a fragmentary cross-sectional view of a hydrodynamic seal according to another preferred embodiment of the present invention, the seal shown in an installed, compressed condition.
Figure 9A:
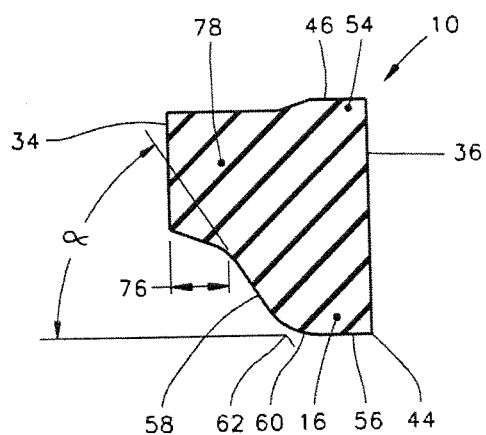
FIG. 9A is a fragmentary view of the hydrodynamic seal of FIG. 9 in an uncompressed condition.
Figure 10:
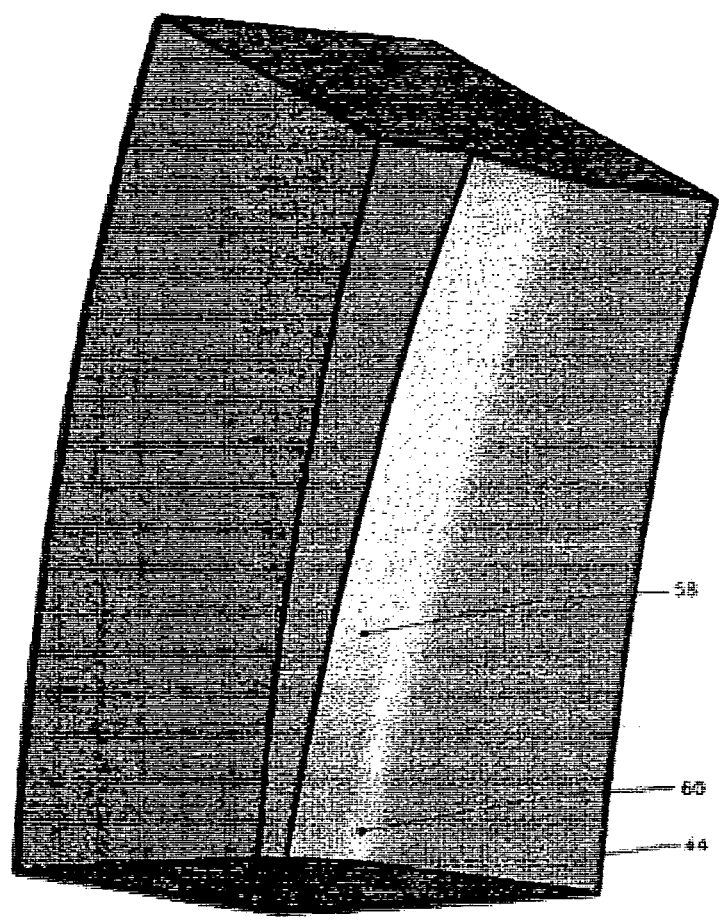
FIG. 10 is a fragmentary shaded perspective view of an alternative embodiment of the hydrodynamic seal showing a hydrodynamic inlet portion of a wave.

It is intended that the rotary seals of the present invention may incorporate one or more seal materials or components without departing from the spirit or scope of the invention, and may be composed of any suitable sealing material or materials, including plastics and elastomeric or rubber-like materials including, but not limited to, carbon, fiber or fabric reinforced elastomers. If desired, the rotary seals may be of monolithic integral, one piece construction as shown in FIGS. 9, 9A and 10, or may also incorporate different materials bonded, inter-fitted, co-vulcanized or otherwise joined together to form a composite structure, such as shown in U.S. Pat. Nos. 5,738,358, 6,315,302, 6,685,194, 6,767,016 and U.S. Pat. Appl. Publications 2006/0214379 and 2006/0214380. Preferably, at least part of the seal is constructed of a resilient material, such as an elastomer.

Elastomers used in seal construction are compounds that include base elastomers such as, but not limited to, HNBR (hydrogenated nitrile, also known as HSN), FKM (fluorocarbon rubber), TFE/P (also known as FEPM) and EPDM. The elastomers may include other compounding ingredients such as, but not limited to, fillers, lubricants, processing aids, anti-degradants, vulcanizing agents, accelerators and activators. The effects of the ingredients are generally understood by individuals having ordinary skill in the art of compounding elastomers.

It is further understood that the invention can, if desired, incorporate an energizer to load the dynamic lip 16 against the relatively rotatable surface 8. The energizer can take any of a number of suitable forms known in the art including, but not limited to, elastomeric rings and various forms of springs such as garter springs, canted coil springs, and cantilever springs, without departing from the scope or spirit of the invention. If desired, the energizer can be located by or within an annular recess of any suitable form. For examples of such energizers and recesses, see U.S. Pat. Nos. 6,685,194 and 7,052,020, and U.S. Pat. Appl. Publications 2006/0214380 and 2007/0013143.

FIGS. 2, 2B, 2C, 2D, 4B and 11 portray seal cross-sections having the high temperature, composite construction taught in U.S. Pat. Appl. Pub. 2006/0214379, where preferably a first material layer 48 of TFE/P is co-vulcanized to a second material layer 49 of FKM.

In FIG. 2, the rotary seal 10 is oriented (i.e., positioned) at least in part by the first machine component 4. For the purpose of illustrating a typical application, the machine 2 has a generally circular seal groove that includes a first groove wall 18 and a second groove wall 20 that are in generally opposed relation to one another, and a peripheral groove wall 22. The first groove wall 18 and the second groove wall 20 are often referred to as the "lubricant-side gland wall," and the "environment-side gland wall," respectively. The peripheral groove wall 22 can be substantially parallel to the relatively rotatable surface 8 as shown, or all or part of it could be skewed with respect to the relatively rotatable surface 8 as shown, for example, by the prior art of FIG. 4, 6, 7, 8 or 9 of U.S. Pat. No. 5,230,520.

For the purpose of establishing consistent nomenclature herein, the seal "groove" is the annular void that is defined by the first groove wall 18, the peripheral groove wall 22, and the second groove wall 20, and the seal "gland" is the generally enclosed annular cavity having a boundary that is defined by the groove and the relatively rotatable surface 8.

The peripheral groove wall 22 is located in spaced relation to the relatively rotatable surface 8, and it (or an energizer) compresses at least a portion of the dynamic lip 16 against the relatively rotatable surface 8. This compression establishes an interfacial contact footprint, shown generally at 38, between the dynamic lip 16 and the relatively rotatable surface 8. The footprint 38 has a first footprint edge located generally at L and facing the first fluid 12, and has a second footprint edge located generally at E and facing the second fluid 14. The second footprint edge E is established by compression of the dynamic exclusionary intersection 44 against relatively rotatable surface 8.

The compression causes contact pressure at the interface (footprint 38) between the dynamic lip 16 and the relatively rotatable surface 8. Sealing is also established at the interface between a static sealing surface 46 of rotary seal 10 and the peripheral groove wall 22. The contact pressure at the footprint 38 establishes sealing in the same manner as any conventional resilient seal, such as an O-ring or a seal having a lip that is loaded by an energizer. The interfacial contact pressure is related to the degree of compression, the modulus of elasticity of the seal material, and the shape of the rotary seal 10.

As taught by U.S. Pat. No. 4,610,319, the first footprint edge L is preferably wavy. Each wave of the footprint 38 has a leading edge and a trailing edge, relative to the direction of relative rotation. When the direction of relative rotation reverses, the application of the leading edge/trailing edge appellations also reverses.

The leading edges of the waves are sites of hydrodynamic wedging action during relative rotation between the dynamic lip 16 and the relatively rotatable surface 8. This hydrodynamic wedging action forces a film of lubricating fluid (i.e., a film of the first fluid 12) into the interfacial contact footprint 38 for lubrication purposes. In other words, the dynamic lip 16 slips or hydroplanes on a film of the first fluid 12 during periods of relative rotation. The hydroplaning activity reduces wear and seal-generated heat, and causes a minute flow of the first fluid 12 past the second footprint edge E and into the second fluid 14. When relative rotation stops, the hydroplaning activity stops, and a static sealing relationship is re-established.

As taught by U.S. Pat. No. 4,610,319, the second footprint edge E (sometimes called the "environment edge") is preferably substantially circular and substantially aligned with the possible directions of relative rotation between the dynamic lip 16 and the relatively rotatable surface 8, and does not produce a hydrodynamic wedging action in response to relative rotation between the dynamic lip 16 and the relatively rotatable surface 8.

Referring to FIG. 2, the rotary seal 10 is preferably held in skew-resisting confinement by virtue of simultaneously contacting the first groove wall 18 and the second groove wall 20. The first groove wall 18 is shown in FIG. 2 as a face of a spring-loaded seal loading ring 24 of the general type taught by FIG. 3-28 of the Kalsi Seals Handbook, Rev. 1. The first groove wall 18 is loaded against the rotary seal 10 by a spring 28 that acts on the seal loading ring 24. The spring load is reacted to a retainer 30 of any suitable form. The spring-loading arrangement can take any of a number of suitable forms without departing from the spirit or scope of the invention. For example, a disk or coil spring arrangement could be substituted for the wave spring arrangement. For examples of coil spring-loaded seal loading rings, see U.S. Pat. No. 1,089,789, FIGS. 1 and 5, and U.S. Pat. No. 3,015,505. The typical spring loading ranges from about 15 pounds per square inch ("psi") "equivalent pressure" at room temperature, to about 45 psi at 400° F. The "equivalent pressure" is calculated by dividing the spring force by the circular area of the gland.

Figure 11:
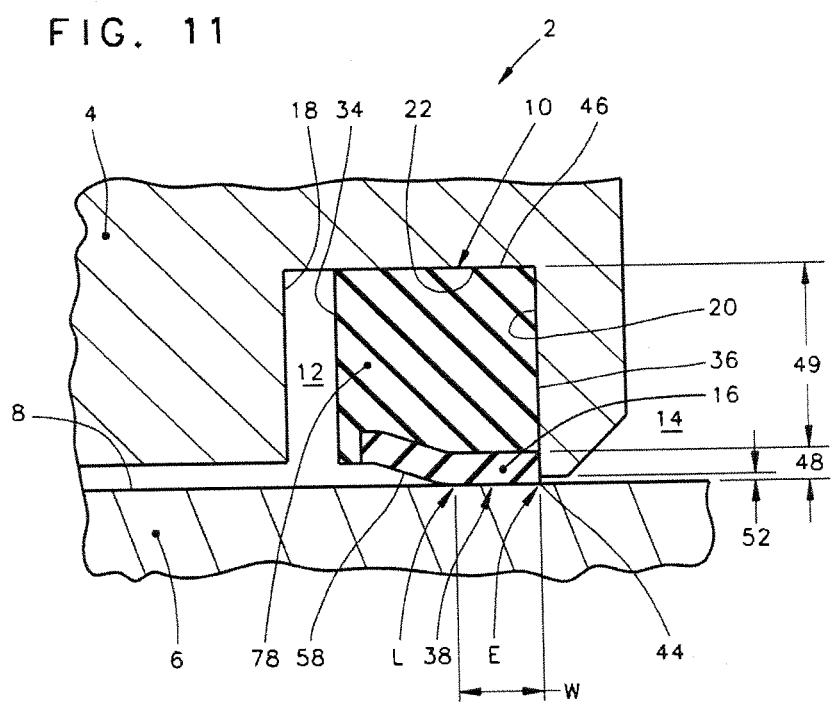
FIG. 11 is a fragmentary cross-sectional view of a hydrodynamic seal according to another preferred embodiment of the present invention, the seal shown in an installed, compressed condition.

Although the first groove wall 18 and the second groove wall 20 are shown to be in movable relation to one another in FIG. 2, such is not intended to limit the scope of the invention, for the invention admits to other equally suitable arrangements. For example, as shown in FIGS. 9 and 11, the first groove wall 18 and the second groove wall 20 could be fixed in position relative to each other. Although the rotary seal 10 is shown as having a contacting relationship with the first groove wall 18 and the second groove wall 20 in FIGS. 2 and 9, the features of the present invention are also advantageous for applications where the rotary seal 10 only contacts one groove wall at a time, as represented by FIG. 11.

As shown in FIG. 2, the rotary seal 10 preferably defines a first seal end 34 that generally faces the first groove wall 18 and first fluid 12, and preferably also defines a second seal end 36 that generally faces the second groove wall 20 and the second fluid 14. The first seal end 34 and the second seal end 36 are often referred to as the "lubricant end" and the "environment end," respectively, and are preferably in generally opposed relation. The first seal end 34 and second seal end 36 can take other forms without departing from the spirit or scope of the invention. For example, the first seal end 34 could be angulated as taught in U.S. Pat. No. 6,315,302 at col. 14, lines 22-22, or could be wavy as taught in U.S. Pat. Appl. Pub. 2007/0205563. For another example, the second seal end 36 could include a recess for incorporating an energizer, as is well-known in the art.

The preferred embodiment of the present invention has application where the first machine component 4, the second machine component 6, or both, are individually rotatable. In the cross-sectional assembly views herein, the direction of relative rotation is normal (perpendicular) to the plane of the cross-section, and approximately concentric to the dynamic exclusionary intersection 44. The theoretical axis of the rotary seal 10 generally coincides with the axis of relative rotation.

In dynamic operation, the relatively rotatable surface 8 has relative rotation with respect to dynamic lip 16 and first machine component 4. The relatively rotatable surface 8 slips with respect to dynamic lip 16, causing the interfacial contact footprint 38 to become a dynamic sealing interface. In the absence of relative rotation, the interfacial contact footprint 38 is a static sealing interface. The rotary seal 10 preferably remains stationary relative to the first machine component 4, however, the prior art teaches that hydrodynamic seal embodiments are possible where relative rotation with the first machine component 4 is allowable; for example, see FIGS. 8 and 8A of U.S. Pat. No. 6,685,194.

In FIG. 2, the rotary seal 10 is shown located in a position that would occur if the pressure of the first fluid 12 were greater than or equal to the pressure of the second fluid 14. In such conditions, the force of the spring 28, and any differential pressure that may be present, forces the rotary seal 10 against the second groove wall 20. Owing to the complimentary shapes of the second seal end 36 and the second groove wall 20, the rotary seal 10 is well supported at all locations except the small clearance gap 52 (often called the "extrusion gap") that exists between the first machine component 4 and the relatively rotatable surface 8.

The relatively rotatable surface 8 can take the form of an externally- or internally-oriented substantially cylindrical surface, as desired, with the rotary seal 10 compressed radially between the peripheral groove wall 22 and the relatively rotatable surface 8, in which case the axis of relative rotation would be substantially parallel to relatively rotatable surface 8. In a radial sealing configuration, the dynamic lip 16 is oriented for compression in a substantially radial direction, and the peripheral groove wall 22 may be of substantially cylindrical configuration, and first groove wall 18, second groove wall 20, first seal end 34 and second seal end 36 may, if desired, be of substantially planar configuration. In a radial sealing configuration, the dynamic lip 16 is located either on the inner or the outer periphery of the seal, depending on whether the relatively rotatable surface 8 is an external or internal cylindrical surface.

Alternatively, the relatively rotatable surface 8 can take the form of a substantially planar surface, with the rotary seal 10 compressed axially between the peripheral groove wall 22 and the relatively rotatable surface 8 in a "face-sealing" arrangement, in which case the axis or relative rotation would be substantially perpendicular to the relatively rotatable surface 8. In an axial (face) sealing configuration, the dynamic lip 16 would be oriented for compression in a substantially axial direction, the peripheral groove wall 22 may be of substantially planar configuration, and the first groove wall 18, second groove wall 20, first seal end 34 and second seal end 36 may, if desired, be of substantially cylindrical configuration. In such face-sealing arrangements, the hydrodynamic features can be oriented to pump in a radially outward direction if the first fluid 12 is located inward of the dynamic lip 16, or can be oriented to pump in a radially inward direction if the first fluid 12 is located outward of the dynamic lip 16. In a face-sealing arrangement, the backup ring 24 is preferably segmented or split. If split, the ring itself can, if desired, provide the spring force.

Large diameter seals are torsionally weak or limp, and therefore, the cross-section of large diameter seals can be rotated so that the dynamic lip 16 can face a relatively rotatable surface 8 of substantially planar or substantially cylindrical form, or even a sloped form. The torsional stiffness of small diameter seals is much higher, and therefore, small diameter seals with a dynamic lip 16 should be manufactured in the desired orientation as dictated by the configuration of the relatively rotatable surface 8 in a given sealing application.

FIG. 2A is a fragmentary view of the rotary seal 10 in the uncompressed condition. To minimize curvature-related foreshortening in the illustrations, for ease of understanding, FIGS. 2A, 3, 4, 5, 6, 7 and 8 are portrayals of seals that are relatively large or infinite in diameter, or as a smaller seal would appear if a short portion thereof is forced straight. The hydrodynamic geometries that are shown herein are bi-directional; that is to say they achieve efficient hydrodynamic lubrication in response to either clockwise or counter-clockwise relative rotation. In other words, the rotary seal 10 is suitable for bi-directional rotation.

FIGS. 2B-2D are section views representative of cutting planes 2B-2B, 2C-2C and 2D-2D, respectively, and represent the uncompressed cross-sectional shape of the rotary seal 10 of the preferred embodiment. These cutting planes are used on FIGS. 2A, 3, 4, 5, 6, 7 and 8. FIGS. 2B, 2D and 4B are section views that are representative of the narrower portions of the dynamic lip 16, and FIG. 2C is representative of the wider portions of the dynamic lip 16.

Referring now to FIGS. 2B-2D, various previously defined portions of rotary seal 10 are labeled for orientation purposes, such as the dynamic lip 16, first seal end 34, second seal end 36, dynamic exclusionary intersection 44, static sealing surface 46, first material layer 48, and second material layer 49.

The static sealing surface 46 may, if desired, be defined by a projecting static lip 54 to provide a degree of twist-inhibiting compressive symmetry, as taught by U.S. Pat. No. 5,230,520. This arrangement provides a recessed surface 55 that, by being recessed, helps to minimize the volume of rotary seal 10, and thereby helps to maximize void volume within the gland. The projecting static lip 54 is preferably oriented in generally opposed relation to the dynamic lip 16. If desired, the embodiments illustrated herein can be simplified by eliminating the projecting static lip 54, such that the static sealing surface 46 is defined by the seal body, as taught by U.S. Pat. No. 4,610,319.

The dynamic lip 16 defines a dynamic surface 56 and a lubricant side flank 58 that are blended by an inlet curvature 60. The dynamic surface 56 and the recessed surface 55 need not be parallel. The lubricant side flank 58 is located in spaced relation with respect to the dynamic exclusionary intersection 44 and the second seal end 36. The inlet curvature 60 can be any suitable curved shape, such as, but not limited to, a radius, a portion of an ellipse, a portion of a sine wave curve, a portion of a parabolic curve, a portion of a cycloid curve, a portion of witch/versiera curves, or combinations thereof. If desired, the static sealing surface 46 and/or the dynamic surface 56 can be of tapered configuration as taught by U.S. Pat. No. 6,767,016.

If extended, the dynamic surface 56 and the lubricant side flank 58 would intersect at a theoretical intersection 62 that is positioned from the dynamic exclusionary intersection 44 by a distance that varies along the circumference of the rotary seal. In other words, the theoretical intersection 62 is non-circular and wavy. The lubricant side flank 58 is also non-circular and wavy. In keeping with American drafting third angle projection conventional representation, the theoretical intersection 62 is represented by an object line in FIGS. 2A, 3, 4, 5, 6, 7 and 8, even though blended by the inlet curvature 60. For a discussion of this blended intersection illustration convention, see paragraph 7.36 and FIG. 7.44(b) on page 213 of the classic drafting textbook "Technical Drawing," 10th edition (Prentice-Hall, Upper Saddle River, N.J.: 1997).

The extent of the inlet curvature 60 is represented by a first extent line 64 and a second extent line 66 in FIGS. 2A, 3, 4, 5, 6, 7 and 8. Preferably, a substantial tangency exists between the inlet curvature 60 and the lubricant side flank 58 at the first extent line 64, and between the inlet curvature 60 and the dynamic surface 56 at the second extent line 66. Note that preferably the first extent line 64 and the second extent line 66 are skewed with respect to the possible directions of relative rotation; in other words, they are non-circular and wavy. Also note that preferably second extent line 66 reverses direction at a First Reversing Location $R_1$ and at a Second Reversing Location $R_2$, and that these locations are preferably staggered by Offset Dimension T. Another way to say this is that some of the blending curves 84 are offset with respect to other of the blending curves 84 by Offset Dimension T. The Offset Dimension T and the local cross-sectional geometry of the inlet curvature 60 in FIGS. 2A, 4, 5, 7 and 8 govern the size of the Offset Dimension X that is shown in FIGS. 2E, 4A, 5A, 7A, and 8A, respectively.

FIG. 2E illustrates a fragmentary portion of the footprint (shown generally at 38) of the rotary seal 10 that is portrayed in FIGS. 2-2D. FIGS. 4A, 5A, 7A and 8A illustrate a fragmentary portion of the footprint 38 of the rotary seal 10 that is portrayed in FIGS. 4, 5, 7 and 8, respectively. FIGS. 2E, 4A, 5A, 7A and 8A use the same nomenclature as FIG. 1, however the subscript "1" has, when necessary, been modified by the addition of an "a" or "b" to designate specific locations of the footprint 38.

Referring now to FIGS. 2A through 2E, the dynamic lip 16 has wider lip locations 80 at cutting plane 2C-2C and narrower lip locations 82 at cutting planes 2B-2B and 2D-2D. The inlet curvature 60 preferably varies in curvature about the circumference of the rotary seal 10. At or near the wider lip locations 80, the inlet curvature 60 is preferably a tighter curve, compared to the curve at the narrower lip locations 82. For example, if the inlet curvature 60 is a variable radius, the radius might be smallest in size at and/or near cutting planes 2C-2C (i.e., at and/or near the wider lip locations 80), medium in size at and/or near cutting planes 2B-2B, and largest in size at and/or near cutting plane 2D-2D (i.e., at the narrower lip locations 82). For another example, the inlet curvature 60 might be a portion of an ellipse, wherein the major axis varies from being smallest at and/or near the wider lip locations 80 (i.e., at and/or near cutting plane 2C-2C), to being largest at and/or near some of the narrower lip locations 82 (such as cutting plane 2D-2D) while varying to a medium size at and/or near other of the narrower lip locations 82 (such as at cutting planes 2B-2B). If desired, the minor and major axes can be identical to each other at and/or near the wider lip locations 80. It is preferred that the inlet curvature 60 variation be sinusoidal. Making the inlet curvature 60 smaller at and/or near the wider lip locations 80, as taught herein, does very little to increase the lubricant shear area of the footprint 38, but significantly impacts the size of Dimension $B_2$.

Referring now to FIG. 2E, the local cross-sectional geometry of the inlet curvature 60 (shown in FIGS. 2A-2D) governs Dimension $A_2$ of the footprint 38, and therefore directly influences the size of Dimension $B_2$. For example, if the inlet curvature 60 is a radius, a larger radius would produce a larger Dimension $A_2$ and a smaller Dimension $B_2$. This is why the large inlet radii on seals constructed in accordance with U.S. Pat. Nos. 6,315,302 and 6,382,634 do not perform as well as desired. The herein-disclosed understanding of the critical relevance of Dimension $A_2$ and Dimension $B_2$ is quite contrary to the conventional wisdom that such prior art seals are based on, and as such represents an inventive step.

Referring to FIG. 2A, the theoretical intersection 62 is preferably a zig-zag shape modified by small blending curves 68 at the narrower lip locations 82, and by blending curves 69 at the wider lip locations 80, so that the inlet curvature 60 and the lubricant side flank 58 are un-faceted.

The first extent line 64 and the second extent line 66 preferably have zig-zag shapes that are generally similar to that of the theoretical intersection 62. The zig-zag shapes of the first extent line 64 and the second extent line 66 are preferably blended by curves at the wider lip locations 80 and at the narrower lip locations 82. Of particular importance, the second extent line 66 is blended by blending curves 84 at the narrower lip locations 82, and by blending curves 86 at the wider lip locations 80. An example of an appropriate curvature basic dimension for the blending curves 68, blending curves 69, blending curves 84 and blending curves 86 would be a radius in the range of 0.050" to 0.200", and preferably in the range of about 0.100" to 0.150". Another example would be that these blending curves should have a curvature basic dimension no looser than that of a 0.200" radius, and preferably no looser than that of a 0.150" radius. For example, a 0.250" radius would be considered to be a looser curvature than a 0.200" radius, and a 0.100" radius would be a tighter curvature than a 0.200" radius. Throughout this specification, the term "basic dimension" has the same definition as is given by Section 1.3.9 of ASME Y14.5M-1994 "Dimensioning and Tolerancing."

The lubricant side flank 58 preferably varies in slope about the circumference of rotary seal 10. Referring to FIGS. 2B-2D, the slope of the lubricant side flank 58 is represented by angle α. As can be seen in FIGS. 2B-2D, the slope of the lubricant side flank 58 is preferably steeper at and/or near the wider lip locations 80, and less steep at and/or near the narrower lip locations 82. This slope is represented by angle α for illustrative purposes, however, it must be borne in mind that lubricant side flank 58 can be curved or straight, or a combination of straight and curved portions, when viewed in a cross-section aligned with the theoretical axis of rotary seal 10 (such as the illustrations of FIGS. 2B-2D). For example, instead of being a straight line having a variable angle about the circumference of the dynamic lip 16, the lubricant side flank 58 could be a curve that varies in slope. One possibility is to utilize a curve that varies from a given radius at the narrower lip locations 82, to an infinite radius (e.g., a straight line) at and/or near the wider lip locations 80. When used for the lubricant side flank 58, the difference between a line and a curve is insignificant due to the relatively small size of the lubricant side flank 58. In other words, either shape, or a combination of the two, can be used to achieve the desired result. The core idea is that the slope of the lubricant side flank 58 changes, being steeper near and preferably at the wider lip locations 80, and less steep nearer and preferably at the narrower lip locations 82. This is in contrast to the teaching of U.S. Pat. No. 6,685,194; for example, see column 15, lines 27-35 of the '194 patent. It is preferred that the variation in the slope of the lubricant side flank 58 be sinusoidal.

Referring to FIGS. 2-2E, in severe operating conditions the first footprint edge L of the footprint 38 may be defined by either the lubricant side flank 58 or by the inlet curvature 60. By having the least slope of the lubricant side flank 58 and the larger size of the inlet curvature 60 near the narrower lip locations 82, a hydrodynamically efficient, gradual convergence exists between the dynamic lip 16 and the relatively rotatable surface 8 in the region that is circumferentially aligned with the $E_{WH}$ dimension, regardless of whether the first footprint edge L happens to be defined by the lubricant side flank 58 or by the inlet curvature 60. Establishing gentle convergence along that portion of the leading edge of the footprint 38 is desirable because it (1) establishes an efficient hydrodynamic wedge at the portion of the leading edge that is circumferentially aligned with the dimension $E_{WH}$, and (2) near that portion within the footprint 38, it establishes a desirably gradual increase in interface contact pressure in the circumferential direction from the First Footprint Edge L to the ridgeline 74. Both of these attributes are beneficial to efficient lubrication of both the swept zone and the un-swept zone.

By making the slope of the lubricant side flank 58 steeper at the wider lip locations 80, the dynamic lip 16 can be wider (for more sacrificial material to accommodate third body wear) and the size difference between Dimension $B_2$ and Width $W_1$ can be maximized, while still fitting within a seal overall width that is compatible with the groove designs and any spring designs present in existing equipment. This enables the seal of the present invention to easily retrofit into existing equipment.

By making the slope of the lubricant side flank 58 steeper at and/or near the wider lip locations 80, void volume within the gland is conserved, making the rotary seal 10 more compatible with skew-resisting confinement in severe operating conditions. In other words, the varying slope of the lubricant side flank 58 helps minimize the volume of the rotary seal 10 in order to assure sufficient void volume within the gland to accommodate tolerances, seal thermal expansion, seal material displaced by compression, and swelling. This in turn helps to maintain interfacial contact pressure within a range that is compatible with efficient hydrodynamic lubrication, while accommodating a relatively large dynamic surface 56 width at the widest locations of the dynamic lip 16, which ensures that the value of $E_{WH}$ remains positive and effective in severe service conditions.

As mentioned previously, it is desirable to avoid the condition where the lubricant side flank is truncated by the lubricant end of the seal, or extends to the lubricant end of the seal. This undesirable seal design characteristic is addressed by the varying slope of the lubricant side flank 58 in the present invention.

The shallow slope of the lubricant side flank 58 at the narrower lip locations 82 provides those portions with more stiffness and support, compared to the situation that would occur if the steeper slope at the wider lip locations 80 were also used at the narrower lip locations 82. This stiffness allows the narrower lip locations 82 to better resist conditions where the pressure of the second fluid 14 is greater than that of the first fluid 12, such as during down-hole swab events. The additional stiffness has several benefits. It minimizes displacement of the second footprint edge $E_1$ relative to Location $P_2$, preserving lubrication. It reduces distortion of the dynamic exclusionary intersection 44, facilitating exclusion of the second fluid 14. It also makes the rotary seal 10 moderately less susceptible to circumferential compression-induced buckling, twisting and skewing in applications where the rotary seal 10 is not held in skew-resisting confinement.

Referring now to FIG. 2E, the footprint 38 has widest locations 70 and narrower locations 72. As with the prior art, a zone of increased contact pressure, termed herein as a "lubricant-side pressure ridge" exists near the first footprint edge L. The center of the lubricant-side pressure ridge is schematically illustrated by ridgeline 74. This ridgeline 74 is representative of the location of the peak contact pressure at any specific circumferential position along the lubricant-side pressure ridge. At any circumferential location, the contact pressure varies from a maximum value at ridgeline 74 to zero at first footprint edge L.

While the contact pressure along the lubricant-side pressure ridge may vary from Location $P_2$ to Location $P_{1(a)}$ and from Location $P_2$ to Location $P_{1(b)}$, the variable inlet curvature 60 of the seal causes the contact pressure at Location $P_{1(a)}$ and Location $P_{1(b)}$ to be much closer in value to that at Location $P_2$, and significantly less than the contact pressure in the prior art at Location $P_1$ of FIG. 1. By so-lowering the contact pressure, lubrication of the mating surfaces of the rotary seal 10 and the relatively rotatable surface 8 in the vicinity of Location $P_{1(a)}$ and Location $P_{1(b)}$ is greatly enhanced. Location $P_{1(a)}$ and Location $P_{1(b)}$ can be thought of as "reversing locations" on ridgeline 74.

The ridgeline 74 is preferably a generally zig-zag shape as shown, comprising more or less straight lines blended by small joining curves 73 and small joining curves 75. This shape provides the lubricant-side pressure ridge with the advantage, as compared to the prior art, of not being generally circumferential over a significant circumferential distance at and near the narrower locations 72 of the footprint 38. This improved orientation allows better lubrication of the mating surfaces of the rotary seal 10 and the relatively rotatable surface 8 in the vicinity of Location $P_{1(a)}$ and Location $P_{1(b)}$. The keeping of the generally circumferentially oriented portions of the ridgeline 74 as short as practicable via use of the small joining curves 73, without creating a facet on the inlet curvature 60 or on the lubricant side flank 58 while keeping the interfacial contact pressure relatively low, is novel. An example of an appropriate curvature basic dimension for the joining curves 73 and the joining curves 75 would be a radius in the range of 0.050" to 0.200", and preferably in the range of about 0.100" to 0.150". Other curve shapes are possible, but preferably they would have a curvature basic dimension no looser than that of a 0.200" radius, and preferably no looser than that of a 0.150" radius.

Varying the size of the inlet curvature 60 to be larger at and/or near the narrower lip locations 82 is quite unconventional in view of the abrupt restrictive diverter teachings of U.S. Pat. No. 6,109,618. The present invention makes portions of the trailing edges of the waves less abrupt, allowing even more lubricant to escape at the wave trailing edges. The effectiveness of this approach was certainly not obvious prior to testing, and the excellent results were contrary to prior engineering judgment. The brilliance of the variable inlet curvature 60, as taught herein, is that (1) It reduces torque and seal generated heat, compared to the prior art, by reducing contact pressure, and facilitating lubrication, at and near the narrower lip locations 82 (i.e., near the Location $P_{1(a)}$ and Location $P_{1(b)}$ of the footprint 38 (see FIG. 2E));

(2) Without causing the corresponding reduction in Dimension $B_2$ that was caused by the use of large inlet radii at the narrowest part of the dynamic lip in the prior art, it makes up for the increased lubricant escape at the trailing portions of the waves by assuring that an efficient, gradual convergence exists between the dynamic lip 16 and the relatively rotatable surface 8 in the portion of the first footprint edge L that is circumferentially aligned with the $E_{WH}$ dimension, and by assuring a gradual rate of increase in contact pressure from that portion of the first footprint edge L to ridgeline 74, in the circumferential direction; and (3) The tighter inlet curvature 60 at the wider lip locations 80 maximizes Dimension $B_2$, to assure that the value of $E_{WH}$ remains positive throughout the useful temperature range of the elastomer used to construct the rotary seal 10, even when the rotary seal 10 is used in skew-resisting confinement.

The need to maintain a positive value for $E_{WH}$ in severe operating conditions was by no means obvious to the prominent group of seal experts who have been researching such seals for decades, who have themselves developed the relevant prior art oilfield seals, and who have been working intensely for years to improve the lubrication of the prior art bi-directional rotation seals.

Contrary to conventional wisdom, it is not the previously defined footprint wave height that governs lubrication. What matters in severe operating conditions is that the value of $E_{WH}$ remains positive, and of sufficient size to assure lubricant migration in severe service conditions. Counter-intuitively, this improved lubrication occurs despite the fact that Dimension $A_{1(a)}$ and Dimension $A_{1(b)}$ are relatively large due to the variably sized nature of the inlet curvature 60, thus increasing the extent of the region within the un-swept zone where the film of the first fluid 12 has to cross unfavorable gradients.

When the present invention is used with skew-resisting constraint, such as shown in FIGS. 2, 9 and 9A, the value of $E_{WH}$ remains positive and effective throughout the useful temperature range of the material used in the construction of rotary seal 10. In designing a seal according to the preferred embodiment of the present invention, the $E_{WH}$ dimension is sized such that, unlike the prior art, it remains present (having a positive value rather than a negative value) and functional throughout the useful elevated temperature range of the polymer used in the construction of the rotary seal 10, even if used with skew-resisting constraint. Based on the conventional wisdom, the former ineffective design methodology was to evaluate the footprint wave height in extreme elevated temperature conditions. The current seal design methodology, which is an aspect of the present invention, is to evaluate the $E_{WH}$ dimension in extreme elevated temperature conditions that represent the upper limit of the useful temperature range of the polymer, to verify that the value of $E_{WH}$ remains positive throughout the useful temperature range of the material used in the construction of the seal, and preferably to insure that the value of $E_{WH}$ remains greater than or equal to 0.020". This methodology is best implemented via computer simulations utilizing three dimensional large displacement finite element analysis modeling that incorporates a conservative linear coefficient of thermal expansion assumption of 13×10-5 inches per inch per degree F., and takes into account the effects of skew-resisting confinement.

Downhole drilling equipment is ordinarily cooled by the circulating drilling fluid to a temperature that is lower than the local environment. When circulation and rotation occasionally cease, the temperature of the equipment may reach the temperature of the surrounding geological environment, if allowed to soak long enough without circulation. Ideally, the useful elevated temperature range used in seal design should be considered to be the temperature that the polymer can withstand for brief periods of time so long as adequate lubrication is present. This "abuse temperature" is greater than the typically quoted long-term temperature capability of a material. For example, hydrogenated nitrile typically is given an extended-term temperature exposure rating of about 300° F., but in a seal constructed of such material and employed in accordance with U.S. Pat. No. 6,315,302, it is highly desirable that the value of $E_{WH}$ remain positive if the seal is temporarily exposed to an "abuse temperature" that is 50° F. higher than that, and preferably the value of $E_{WH}$ will remain greater than or equal to 0.020".

The service rating of TFE/P is typically 450° F., and the service rating of FKM is typically 400° F. When two different temperature-rated materials are used in the same seal, it is the lower service rating that typically governs the seal design. Therefore, a TFE/P-FKM composite seal would preferably have a service rating of 400° F., and in a spring-loaded seal constructed of that material combination, it would be desirable that the value of $E_{WH}$ remain positive if the seal is temporarily exposed to an "abuse temperature" that is 50° F. higher than that, and preferably the value of $E_{WH}$ will remain greater than or equal to 0.020".

Another way to state this is that the validation temperature used in the computer model of the seal, when validating the seal design for a positive $E_{WH}$ value, should be at least equal to the operating temperature limit of the least temperature-capable elastomer used in the construction of the seal (as that operating temperature limit is generally understood within the elastomer industry), and preferably the validation temperature should be 50° F. greater than the aforesaid operating temperature limit.

Referring to FIG. 2E, Dimension $B_{1(a)}$ and Dimension $B_{1(b)}$ are preferably different in size, so that Location $P_{1(a)}$ and Location $P_{1(b)}$ are misaligned—i.e., offset—by Offset Dimension X. This offset is desirable so that the film disturbances created by the direction reversals of the ridgeline 74 at Location $P_{1(a)}$ and Location $P_{1(b)}$ do not lie in one-another's wake. This minimizes the circumferential extent of each such film disturbance and facilitates lubrication. The relative size of Dimension $B_{1(a)}$ and Dimension $B_{1(b)}$ is preferably controlled by the local cross-sectional geometry of the inlet curvature 60 of the dynamic lip 16 that is shown in FIGS. 2-2D. In those figures, note that the size of the inlet curvature 60 differs between Section 2B-2B and Section 2D-2D; this causes Dimension $B_{1(a)}$ and Dimension $B_{1(b)}$ to differ at the corresponding locations of the footprint 38. The salient point, however, is that Location $P_{1(a)}$ and Location $P_{1(b)}$ are offset with respect to each other, regardless of how the offset is achieved. Another way of saying this is that at least some of the joining curves 73 are misaligned with respect to others. In FIG. 2E, some of the waves of the ridgeline 74 are different than other of its waves.

The cooperative benefits of the various features provides more complete lubrication, especially in the un-swept zone, in either direction of rotation. The invention is suitable for a wider range of service conditions, including faster and slower rotary speeds, higher differential pressures, and thinner lubricants. Running torque is reduced, resulting in less self-generated heat. The result is better tolerance to high ambient environment temperature, less heat-related compression set, less footprint spread, less seal wear, longer polymer life, a higher retained modulus for improved extrusion resistance, lower interfacial contact pressure when installed in skew-resisting confinement, less slippage within the groove, and less tendency to cause floating compensation pistons to rotate.

3. Description of Simplifications and Alternate Embodiments

The seal of FIGS. 2-2D includes several desirable features that are most advantageously used together, however simplifications are possible where one or more of the features are omitted or revert to the teachings of the prior art. FIGS. 3, 4, 5, 6, 7 and 8 represent simplifications and alternate embodiments of the invention, and are fragmentary views of a rotary seal 10 in the uncompressed condition thereof, showing a seal that is relatively large or infinite in diameter, or as a smaller seal would appear if a short portion thereof were forced straight, so that no curvature-related foreshortening is apparent. Cutting planes 2B-2B, 2C-2C, 2D-2D, and 4B-4B correspond to the cross-sections shown in FIGS. 2B, 2C, 2D, and 4B, respectively.

To orient the reader, various previously defined features of the rotary seal 10 are labeled in FIGS. 3, 4, 5, 6, 7 and 8, such as the first seal end 34, second seal end 36, theoretical intersection 62, first extent line 64, second extent line 66, dynamic surface 56, lubricant side flank 58, inlet curvature 60, wider lip locations 80, narrower lip locations 82, blending curves 84, blending curves 86, First Reversing Location $R_1$, Second Reversing Location $R_2$ and Offset Dimension T. Additionally, in FIGS. 3, 4 and 8, the previously designated blending curves 68 are labeled to orient the reader.

The rotary seal 10 of FIG. 3 is a simplification of the preferred embodiment of the present invention that differs from that of FIG. 2A in one respect—each of the narrower lip locations 82 (at cutting planes 2D-2D) is substantially the same, which means that Offset Dimension T equals zero. The inlet curvature 60 varies in curvature about the circumference of the seal, being a tighter curve at cutting plane 2C-2C, and looser at cutting plane 2D-2D.

The rotary seal 10 of FIGS. 4 and 4B is a simplification of the preferred embodiment of the present invention that differs from that of FIG. 2A in one respect—the inlet curvature 60 does not vary between cutting plane 2C-2C and cutting plane 4B-4B, as taught by the prior art. As a result, First Reversing Location $R_1$ is offset from Second Reversing Location $R_2$ by Offset Dimension T. In FIG. 4B, which is representative of the cutting plane 4B-4B in FIG. 4, various previously defined portions of rotary seal 10 are labeled for orientation purposes, such as angle α, dynamic lip 16, first seal end 34, second seal end 36, dynamic exclusionary intersection 44, static sealing surface 46, first material layer 48, second material layer 49, projecting static lip 54, lubricant side flank 58, inlet curvature 60 and theoretical intersection 62. The inlet curvature 60 in FIG. 4 is the same as in the view of FIG. 2C, while the slope of the lubricant side flank 58 is shown as being the same as in FIG. 2D.

The rotary seal 10 of FIG. 5 is a simplification of the preferred embodiment of the present invention that differs slightly from that of FIG. 2A in that the theoretical intersection 62 is sinusoidal, as taught by the prior art. The variable size of inlet curvature 60 that is taught in this specification can be used with various wavy shapes, however it is best employed with the modified zig-zag wave shape of FIG. 2A.

The rotary seal 10 of FIG. 6 is a simplification of the preferred embodiment of the present invention that differs slightly from that of FIG. 3 in that the theoretical intersection 62 is sinusoidal, as taught by the prior art.

The rotary seal 10 of FIG. 7 is an alternate embodiment of the present invention that differs slightly from that of FIG. 4 in that the theoretical intersection 62 is sinusoidal, as taught by the prior art. In FIGS. 5, 6 and 7, The first extent line 64 and the second extent line 66 have shapes that are similar to that of the theoretical intersection 62.

The rotary seal 10 of FIG. 8 is an alternate embodiment of the present invention that accomplishes the Offset Dimension T between First Reversing Location $R_1$ and Second Reversing Location $R_2$ by having a different dynamic lip width at the First Reversing Location $R_1$, compared to the lip width at the Second Reversing Location $R_2$. In other words, some of the narrower lip locations 82 have a different width than other of the narrower lip locations 82, and in general, some of the waves of the dynamic lip 16 are different than other of its waves. Also, some of the waves of the second extent line 66 are different than other of its waves. The inlet curvature 60 may, if desired, be the same size throughout, as shown. Note that some of the blending curves 68 of the theoretical intersection 62 are offset with respect to other of the blending curves 68; this means that some of the waves of the theoretical intersection 62 are different than other of its waves.

FIGS. 3A, 4A, 5A, 6A, 7A and 8A represent the footprint 38 of the simplifications and alternate embodiments that are shown in FIGS. 3, 4, 5, 6, 7 and 8, respectively. To orient the reader, various previously defined portions of the footprint 38 are labeled in FIGS. 3A, 4A, 5A, 6A, 7A and 8A, such as Dimension $A_{1(a)}$, Dimension $A_{1(b)}$, Dimension $A_2$, Dimension $B_{1(a)}$, Dimension $B_{1(b)}$, Dimension $B_2$, First Footprint Edge L, Second Footprint Edge E, Location $P_{1(a)}$, Location $P_{1(b)}$, Location $P_2$, Offset Dimension X, first fluid 12, second fluid 14, widest locations 70, narrower locations 72, joining curves 73. ridgeline 74 and joining curves 75. The previously defined Width $W_1$ is labeled in FIGS. 3A, 4A, 5A, 6A, and 7A to orient the reader; in FIG. 8A, two different sizes of narrower width location are shown as Width $W_1(a)$ and Width $W_1(b)$.

In FIG. 3A, the peak pressure of ridgeline 74 at the narrowest points of the footprint 38 are circumferentially aligned, unlike those in FIG. 2E. In other words, Dimension $B_{1(a)}$ and Dimension $B_{1(b)}$ are similarly sized, so that Location $P_{1(a)}$ and Location $P_{1(b)}$ are substantially aligned. With such a simplification, the initial tooling manufacturing cost is reduced because design effort is reduced.

The footprint 38 of FIG. 4A differs from that of FIG. 2E in one important respect—in FIG. 4A the contact pressure is relatively high at and near Location $P_{1(b)}$ because the inlet curvature 60 in FIG. 4 does not vary between cutting plane 2C-2C and cutting plane 4B-4B. With this alternate embodiment, the peak pressures of the ridgeline 74 at the narrower locations 72 of the footprint 38 are circumferentially misaligned—i.e., offset—by Offset Dimension X so that the film disturbances created by the direction reversal of the ridgeline 74 at Location $P_{1(a)}$ and Location $P_{1(b)}$ do not lie in one-another's wake. Some of the waves of the ridgeline 74 are different than other of its waves.

The footprints 38 identified in FIGS. 5A, 6A and 7A differ from those of FIGS. 2E, 3A and 4A, respectively, in that the ridgeline 74 and the First Footprint Edge L are sinusoidal rather than a modified zig-zag. In FIGS. 5A and 7A, some of the waves of the ridgeline 74 are different than other of its waves.

The graph of FIG. 7B represents interfacial contact pressure at selected circumferential slices of the rotary seal 10 of FIGS. 2A and 7. The slice representative of the rotary seal 10 of FIG. 2A was taken between cutting planes 2C-2C and 2B-2B, and the slice representative of the rotary seal 10 of FIG. 7 was taken between cutting planes 2C-2C and 4B-4B. One circumferential slice is aligned with Location $P_{1(a)}$ of FIG. 2E, and the other circumferential slice is aligned with Location $P_{1(b)}$ of FIG. 7A. Note that the gradient and magnitude of the FIG. 2E contact pressure is preferable to that of FIG. 7A. This shows the benefit of the wave pattern and the varying size of the inlet curvature 60 of the rotary seal 10 of FIG. 2A, compared to that of FIG. 7.

The disadvantage of the embodiments of FIGS. 5, 6 and 7, compared to the zig-zag counterparts of FIGS. 2A, 3 and 4, is that significant portions of the ridgeline 74 at the narrower locations 72 of the footprint 38 have a generally circumferential orientation as shown in FIGS. 5A, 6A and 7A, which is disruptive to the lubricating film. All of the seals described herein can be further simplified, if space permits, by having a lubricant side flank 58 with a slope that does not vary about the circumference of rotary seal 10.

FIG. 8A is representative of the footprint 38 of the rotary seal 10 that is shown in FIG. 8. The peak pressures of the ridgeline 74 at the narrower locations 72 of the footprint 38 are circumferentially misaligned—i.e., offset—by Offset Dimension X so that the film disturbances created by the direction reversal of the ridgeline 74 at Location $P_{1(a)}$ and Location $P_{1(b)}$ do not lie in one-another's wake. Offset Dimension X is governed by the Offset Dimension T and the local cross-sectional geometry of the inlet curvature 60 that is illustrated in FIG. 8. The un-swept zone is defined by Width $W_1(a)$, since it is smaller than Width $W_1(b)$. Some of the waves of the ridgeline 74 are different than other of its waves, and some of the waves of the First Footprint Edge L are different than other of its waves.

FIG. 9 is a fragmentary cross-sectional view that provides a general overview of another preferred embodiment of the present invention. FIG. 9A shows the rotary seal 10 of FIG. 9 in its uncompressed condition. Many of the previously described features are numbered in FIGS. 9 and 9A to orient the reader.

Machine 2 incorporates a first machine component 4 and a second machine component 6 that includes a relatively rotatable surface 8. The rotary seal 10 has a generally circular, ring-like configuration and at least one dynamic lip 16 that is also generally circular in form. At least a portion of the dynamic lip 16 is held in compressed, contacting relation with the relatively rotatable surface 8, and establishes sealing engagement with the relatively rotatable surface 8, to retain a first fluid 12, to partition the first fluid 12 from a second fluid 14, and to exclude the second fluid 14. In dynamic operation, the relatively rotatable surface 8 has relative rotation with respect to the dynamic lip 16 and with respect to first machine component 4. The dynamic lip 16 incorporates a dynamic exclusionary intersection 44 of abrupt substantially circular form that is substantially aligned with the direction of relative rotation.

The rotary seal 10 is oriented by the first machine component 4, which has a generally circular seal groove that includes a first groove wall 18 and a second groove wall 20 that are preferably in generally opposed relation to one another. The first machine component 4 also has a peripheral groove wall 22 that is located in spaced relation to the relatively rotatable surface 8, and compresses the rotary seal 10 against the relatively rotatable surface 8.

Although first groove wall 18 and second groove wall 20 are shown to be in fixed, permanent relation to one another, such is not intended to limit the scope of the invention, for the invention admits to other equally suitable forms. For example, first groove wall 18 and/or second groove wall 20 could be configured to be detachable from the first machine component 4 for ease of maintenance and repair, but then assembled in more or less fixed location for locating and constraining the rotary seal 10.

In FIG. 9, the rotary seal 10 is held in skew-resisting confinement by virtue of simultaneously contacting the first groove wall 18 and the second groove wall 20 under operating conditions. In the prior art axially-constrained seals made in accordance with U.S. Pat. No. 6,315,302, even though the designers meticulously evaluated the footprint wave height in elevated temperature conditions, the heretofore unknown $E_{WH}$ dimension became compromised in elevated temperature conditions, causing loss of lubrication in the un-swept zone. This and other previously described lubrication problems are managed by incorporating any, or all, of the design features that were previously disclosed in conjunction with FIGS. 2-8.

Rotary seal 10 defines a first seal end 34 that generally faces the first groove wall 18 and first fluid 12. Rotary seal 10 also defines a second seal end 36 that generally faces the second groove wall 20 and the second fluid 14. The compression of the dynamic lip 16 against the relatively rotatable surface 8 establishes and defines an interfacial contact footprint, shown generally at 38, between the dynamic lip 16 and the relatively rotatable surface 8. The footprint 38 has a first footprint edge located generally at L and facing the first fluid 12, and has a second footprint edge located generally at E and facing the second fluid 14. The second footprint edge E is established by compression of the dynamic exclusionary intersection 44 against the relatively rotatable surface 8. The footprint 38 can take the form of any of the footprints shown in FIG. 2E, 3A, 4A, 5A, 6A, 7A or 8A, with the same characteristics and benefits. The labels in those figures are therefore appropriate to this discussion of FIGS. 9 and 9A.

If desired, in the uncompressed condition the first seal end 34 may be wavy and vary in position relative to the second seal end 36, as taught by U.S. Pat. Appl. Pub. 2007/0205563. This embodiment, and other embodiments, may if desired also incorporate an exclusion edge chamfer in accordance with the teachings of U.S. Pat. No. 6,120,036.

The dynamic lip 16 and the footprint 38 can have any or all of the attributes previously described in conjunction with FIGS. 2 to 8A; the following citations of such attributes do not represent an exhaustive list of the previously described attributes. The theoretical intersection 62 can have the previously described modified zig-zag shape, or other desired wave shape. The slope of the lubricant side flank 58 can vary around the circumference of the rotary seal 10, being steepest at the widest portions of the dynamic lip 16 to conserve void volume, and to maximize the body length 76. The slope is represented by angle α, however as described previously, the lubricant side flank 58 can be straight or curved in the cross-sectional view shown (even if straight in the uncompressed condition, the lubricant-side flank 58 tends to become curved in the compressed condition). The varying slope of the lubricant side flank 58 allows the $E_{WH}$ dimension of the footprint 38 to be increased without increasing the volume of the rotary seal 10, compared to the prior art. The varying slope also tends to strengthen the narrowest parts of the dynamic lip 16. This helps the dynamic exclusionary intersection 44 to remain more circular when the pressure of the second fluid 14 is greater than the first fluid 12.

When installed in skew-resisting confinement as taught by U.S. Pat. No. 6,315,302 and shown here in FIG. 9, the unsupported length (from first groove wall 18 to first footprint edge L) of the rotary seal 10 acts as a skew-resisting spring. The varying slope of the lubricant side flank 58 serves to maximize the exposed length 76 of the body 78 near the wider parts of the dynamic lip 16, which lowers the effective spring rate of the seal body 78 by minimizing the spring force contribution of the dynamic lip 16.

While FIG. 13 of U.S. Pat. No. 6,334,619 also discloses a seal with a variably angled flank, the purpose was not to conserve void volume or to preserve body length 76, since that flank is in intimate contact with a similarly shaped backup ring, which supports and constrains the flank, and the flank extends to the end of the seal body. Here in FIG. 9, the lubricant side flank 58 is part of an "unconstrained geometry" as taught by U.S. Pat. No. 6,315,302, so that additional compression or thermal expansion of the rotary seal 10 is compensated by displacement by the unconstrained geometry of the lubricant side flank 58; see col. 11, lines 42-46 and col. 12, lines 13-20 of the '302 patent. The seal in FIG. 13 of U.S. Pat. No. 6,334,619 is not constrained in a manner that requires or permits the flank to serve as an unconstrained geometry to avoid excessive confinement-related and thermal expansion-related contact pressure. Even if it were so-constrained, as shown in the non-varying flank examples of FIGS. 2C, 2E, 6 and 10 of U.S. Pat. No. 6,334,619, the "unconstrained geometry" function could not be served by the angulated, well-supported lip flank. In the present invention, the lubricant side flank 58 is located remote from the first groove wall 18, establishing void volume within the gland.

The inlet curvature 60 can vary about the circumference of the rotary seal 10, being a tighter curvature at the wider portions of the dynamic lip 16, and a looser curvature at the narrowest portions of the dynamic lip 16. These features help to assure adequate seal lubrication at higher temperatures despite the higher interfacial contact pressure associated with skew-resisting confinement, as described previously in conjunction with FIGS. 2-2E.

FIG. 10 is an enlarged fragmentary shaded perspective view of an uncompressed seal of an embodiment of the present invention in an uncompressed state, as such a seal would be configured for radial compression against a relatively rotatable shaft. This figure is included to facilitate the reader's understanding of the variable slope of the lubricant side flank 58, the variable curvature of the inlet curvature 60, and the generally circular configuration of the dynamic exclusionary intersection 44. The inlet curvature 60 is a radius that is smaller at the widest part of the dynamic lip, and larger at the narrower part of the dynamic lip. The lubricant side flank 58 is a sloped surface that is steeper at the widest part of the dynamic lip, and less steep at the narrower part of the dynamic lip. The wave form is a modified zig-zag shape of the type shown between cutting planes 2C-2C and 2D-2D in FIGS. 2A, 3 and 4. Instead of the dual material construction shown in FIGS. 2B-2D and 4B, the rotary seal 10 in FIG. 10 is illustrated as being constructed from a single elastomeric material.

The present invention also provides a lubrication advantage over the prior art when the seal is not constrained by the walls of the groove. FIG. 11 is a fragmentary cross-sectional view of an installed, ring-shaped hydrodynamic rotary seal 10 embodying the principles of the present invention, and installed in the machine that is shown generally at 2. The machine 2 includes a first machine component 4 and a second machine component 6 that defines a relatively rotatable surface 8. FIG. 11 differs from that of FIG. 2 in that the first groove wall 18 and the second groove wall 20 are both defined by the first machine component 4 and are not both in contact with the rotary seal 10. The arrangement shown in FIG. 11 lacks the backup ring 24, spring 28, and retainer 30 that are provided in FIG. 2. The peripheral groove wall 22 compresses the dynamic lip 16 of the rotary seal 10 against the relatively rotatable surface 8 of the second machine component 6, establishing a footprint shown generally at 38 that has Width W, a first footprint edge generally at L and a second footprint edge generally at E. The static sealing surface 46 has sealed engagement with the peripheral groove wall 22. The second footprint edge E is established by compression of dynamic exclusionary intersection 44 against the relatively rotatable surface 8.

The rotary seal 10 is shown in the position it would assume when the pressure of the first fluid 12 is greater than that of the second fluid 14. The second seal end 36 is supported by the second groove wall 20 at all locations except the clearance gap 52. The first seal end 34 is not touching the first groove wall 18. The rotary seal 10 and the footprint 38 can incorporate the features and advantages of the invention that have previously been described, sans the implications of skew-resisting confinement. The rotary seal 10 in FIG. 11 is prevented from skewing and twisting only when the pressure of the first fluid 12 is sufficiently higher than the pressure of the second fluid 14.

4. Conclusion

In view of the foregoing it is evident that the present invention is one that is well adapted to attain all of the objects and features hereinabove set forth, together with other objects and features which are inherent in the apparatus disclosed herein.

Even though several specific hydrodynamic rotary seal and seal gland geometries are disclosed in detail herein, many other geometrical variations employing the basic principles and teachings of this invention are possible.

The foregoing disclosure and description of the invention are illustrative and explanatory thereof, and various changes in the size, shape and materials, as well as in the details of the illustrated construction, may be made without departing from the spirit of the invention. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A rotary seal assembly, comprising:
   a first machine component having a seal groove defined by generally opposing first and second groove walls and a peripheral groove wall;
   a second machine component located at least partially within said first machine component having a relatively rotatable surface in generally opposed relation to said peripheral groove wall and rotatable relative to said first machine component;
   a generally ring-shaped interference-type rotary seal located at least partially within said seal groove and having a volume, said rotary seal comprising a seal body of resilient thermally expandable sealing material, said seal body having axially-facing first and second seal ends;
   wherein in an uncompressed condition
      said seal body including a dynamic lip of generally circular form, said dynamic lip having an abrupt dynamic exclusionary intersection, a dynamic surface facing radially inward, a lubricant side flank that is non-circular having a slope in an axial direction and located in spaced relation with respect to said dynamic exclusionary intersection, a hydrodynamic inlet curvature located between and separating said dynamic surface and said lubricant side flank and located in spaced relation with respect to said dynamic exclusionary intersection and being at least a portion of a wavy, rotationally bi-directional hydrodynamic geometry,
      said seal body including an inwardly facing surface between said first seal end and at least part of said lubricant side flank, said inwardly facing surface and said lubricant side flank located entirely radially outward of said dynamic surface and in spaced relation to said dynamic surface,
      said dynamic surface extending from said inlet curvature to said dynamic exclusionary intersection, and
      said dynamic surface having at least two wider surface locations, at least one of said wider surface locations being the widest dynamic surface location between two narrower surface locations, at least one of said two narrower surface locations being the narrowest dynamic surface location between said at least two wider surface locations;
      said hydrodynamic inlet curvature adjoining said lubricant side flank and said dynamic surface and extending continuously in a circumferential direction from one of said narrower surface locations, past said widest dynamic surface location and past said narrowest dynamic surface location to one of said wider surface locations;
   said dynamic lip being held in compression against said relatively rotatable surface and defining a circumferential interfacial contact footprint against said relatively rotatable surface, said interfacial contact footprint comprising peripheral first and second footprint edges, said first footprint edge being generally wavy, a footprint width defined between said first and second footprint edges, said interfacial contact footprint having at least two wider footprint locations, at least one of said wider footprint locations being the widest footprint location between two narrower footprint locations, at least one of said two narrower footprint locations being the narrowest footprint location between said at least two wider footprint locations;

wherein said slope of said lubricant side flank in the uncompressed condition being steepest relative to said dynamic surface at said widest dynamic surface location minimizing said volume, and said compression establishing interfacial contact pressure within said interfacial contact footprint including a lubricant-side pressure ridge along said first footprint edge, said lubricant-side pressure ridge having a ridgeline established by the maximum interfacial contact pressure of the lubricant-side pressure ridge at each circumferential location of said interfacial contact footprint, and at said widest footprint location said interfacial contact pressure increasing from zero at said first footprint edge to a greater value at a Position $P_2$ on said ridgeline, said rotary seal maintaining a positive value of $E_{WH}$, wherein $$E_{WH} = \text{Dimension } B_2 - \text{Width } W_1$$

where Dimension $B_2$ is an axial length from said second footprint edge to said Position $P_2$ on said ridgeline at said widest footprint location, and Width $W_1$ is said axial footprint width at said narrowest footprint location, and said Dimension $B_2$ is governed at least in part by said inlet curvature at said widest dynamic surface location.

2. The rotary seal assembly of claim 1, wherein said rotary seal is held in skew-resisting confinement by virtue of simultaneous contact of said first seal end with said first groove wall and said second seal end with said second groove wall.

3. The rotary seal assembly of claim 2, wherein said first and second groove walls are spaced a fixed distance from one another.

4. The rotary seal assembly of claim 2, wherein at least one of said first and second groove walls is a spring-loaded moveable gland wall.

5. The rotary seal assembly of claim 1, wherein:
said sealing material having an operating temperature range having an upper bound established by an upper temperature, and
said rotary seal being held in skew-resisting confinement at said upper temperature by virtue of simultaneous contact of said first seal end with said first groove wall and said second seal end with said second groove wall, and said value of $E_{WH}$ remaining positive at said upper temperature.

6. The rotary seal assembly of claim 5, wherein said rotary seal has a positive value of $E_{WH}$ of at least 0.020" at said upper temperature.

7. The rotary seal assembly of claim 5, wherein said rotary seal has a positive value of $E_{WH}$ of at least 0.020" at a temperature 50° F. greater than said upper temperature.

8. The rotary seal assembly of claim 1, wherein at least a portion of said lubricant side flank being located between at least a portion of said inwardly facing surface of said seal body and said inlet curvature.

9. The rotary seal assembly of claim 1, wherein in said uncompressed condition said dynamic lip further defines a theoretical intersection of said dynamic surface and said lubricant side flank, at least part of said theoretical intersection is a generally zig-zag shape with small blending curves.

10. The rotary seal assembly of claim 1, wherein in said uncompressed condition an extent line is defined by a substantial tangency between said inlet curvature and said dynamic surface, wherein said extent line has a generally zig-zag shape blended by an extent line blending curve at said narrowest dynamic surface location, said extent line extending in the circumferential direction from one of said narrower surface locations, past said widest dynamic surface location and past said narrowest dynamic surface location to one of said wider surface locations.

11. The rotary seal assembly of claim 1, wherein in said uncompressed condition said dynamic lip further defines a theoretical intersection of said dynamic surface and said lubricant side flank, at least part of said theoretical intersection is a generally zig-zag shape.

12. The rotary seal assembly of claim 1, wherein said inwardly facing surface has an exposed length present between said first seal end and at least part of said lubricant side flank, said exposed length being present at at least said widest dynamic surface location.

13. The rotary seal assembly of claim 1, wherein said inwardly facing surface has an exposed length present between said first seal end and at least part of said lubricant side flank, said exposed length being present at at least said narrowest dynamic surface location.

14. The rotary seal assembly of claim 1, wherein said lubricant side flank being an unconstrained geometry and being axially spaced from said first groove wall.

15. The rotary seal assembly of claim 1, wherein in said uncompressed condition said dynamic exclusionary intersection being generally circular, and at least part of a theoretical intersection between said dynamic surface and said lubricant side flank varies in position from said dynamic exclusionary intersection in a wavy zig-zag shape.

16. The rotary seal assembly of claim 1, wherein said rotary seal is held in skew-resisting confinement at room temperature by virtue of simultaneous contact of said first seal end with said first groove wall and said second seal end with said second groove wall.

17. A rotary seal assembly, comprising:
a first machine component having a seal groove defined by generally opposing first and second groove walls and a peripheral groove wall;
a second machine component located at least partially within said first machine component having a relatively rotatable surface in generally opposed relation to said peripheral groove wall and rotatable relative to said first machine component;
a generally ring-shaped interference-type rotary seal located at least partially within said seal groove, said rotary seal comprising a seal body of at least one resilient sealing material, said seal body having first and second seal ends;
wherein in an uncompressed condition
said seal body including a dynamic lip having a dynamic exclusionary intersection of abrupt form, a dynamic surface facing radially inward, a lubricant side flank having a slope in an axial direction, and a hydrodynamic inlet curvature located between and separating said dynamic surface and said lubricant side flank, said inlet curvature being at least part of a hydrodynamic geometry,
said seal body including an inwardly facing surface between said first seal end and at least part of said lubricant side flank and said dynamic lip projecting radially inward of said inwardly facing surface, said lubricant side flank located entirely radially outward of said dynamic surface and in spaced relation to said dynamic surface, said dynamic surface having an axial width between said dynamic exclusionary intersection and said inlet curvature that in a circumferential direction increases from a first narrower surface location to a first wider surface location, decreases from said first wider surface location to a second narrower surface location, increases from said second narrower surface location to a second wider surface location, and decreases from said second wider surface location to a third narrower surface location, wherein said first wider surface location being situated between said first and second narrower surface locations and being the widest dynamic surface location between said first and second narrower surface locations, being referred to as the first widest dynamic surface location, said second narrower surface location being situated between said first and second wider surface locations and being the narrowest dynamic surface location between said first and second wider surface locations, and said second wider surface location being situated between said second and third narrower surface locations and being the widest dynamic surface location between said second and third narrower surface locations, being referred to as the second widest dynamic surface location, said dynamic lip being held in compression against said relatively rotatable surface and defining a circumferential interfacial contact footprint against said relatively rotatable surface, said interfacial contact footprint comprising peripheral first and second footprint edges, said first footprint edge being generally wavy, said interfacial contact footprint having an axial footprint width between said first and second footprint edges that in the circumferential direction increases from a first narrower footprint location to a first wider footprint location, decreases from said first wider footprint location to a second narrower footprint location, increases from said second narrower footprint location to a second wider footprint location, and decreases from said second wider footprint location to a third narrower footprint location, wherein said first wider footprint location being situated between said first and second narrower footprint locations and being the widest footprint location between said first and second narrower footprint locations, being referred to as the first widest footprint location, said second narrower footprint location being situated between said first and second wider footprint locations and being the narrowest footprint location between said first and second wider footprint locations, said second wider footprint location being situated between said second and third narrower footprint locations and being the widest footprint location between said second and third narrower footprint locations, being referred to as the second widest footprint location, and wherein said compression of said dynamic lip against said relatively rotatable surface establishes interfacial contact pressure within said interfacial contact footprint including a lubricant-side pressure ridge along said first footprint edge, said lubricant-side pressure ridge having a ridgeline established by the maximum interfacial contact pressure of the lubricant-side pressure ridge at each circumferential location of said interfacial contact footprint, and at said first widest footprint location said interfacial contact pressure increasing from zero at said first footprint edge to a greater value at a Position $P_2$ on said ridgeline, said rotary seal maintaining a positive value of $E_{WH}$, wherein $$E_{WH} = \text{Dimension } B_2 - \text{Width } W_1$$

where Dimension $B_2$ is an axial length from said second footprint edge to said Position $P_2$ at said first widest footprint location, and Width $W_1$ is said axial footprint width at said narrowest footprint location, and said Dimension $B_2$ is governed at least in part by said inlet curvature at said first widest dynamic surface location; and said slope of said lubricant side flank in the uncompressed condition varies from said first widest dynamic surface location to said narrowest dynamic surface location, said slope being steeper relative to said dynamic surface at said first widest dynamic surface location than at said narrowest dynamic surface location, and being steeper relative to said dynamic surface at said first widest footprint location than at said narrowest footprint location, said first widest footprint location corresponding circumferentially to said first widest dynamic surface location, and said narrowest dynamic surface location corresponding circumferentially to said narrowest footprint location.

18. The rotary seal assembly of claim 17, wherein said rotary seal held in skew-resisting confinement by virtue of simultaneous contact of said first seal end with said first groove wall and said second seal end with said second groove wall.

19. The rotary seal assembly of claim 18, wherein said first and second groove walls are spaced a fixed distance from one another.

20. The rotary seal assembly of claim 18, wherein at least one of said first and second groove walls is a spring-loaded moveable gland wall.

21. The rotary seal assembly of claim 17, wherein:
said sealing material being thermally expandable and having an operating temperature range having an upper bound established by an upper temperature;
said rotary seal being held in skew-resisting confinement at said upper temperature by virtue of simultaneous contact of said first seal end with said first groove wall and said second seal end with said second groove wall, and said value of $E_{WH}$ remaining positive at said upper temperature.

22. The rotary seal assembly of claim 21, wherein said rotary seal has a positive value of $E_{WH}$ of at least 0.020" at said upper temperature.

23. The rotary seal assembly of claim 21, wherein said rotary seal has a positive value of $E_{WH}$ of at least 0.020" at a temperature 50° F. greater than said upper temperature.

24. The rotary seal assembly of claim 17, wherein at least a portion of said lubricant side flank being located between at least a portion of said inwardly facing surface of said seal body and said inlet curvature.

25. The rotary seal assembly of claim 17, wherein in said uncompressed condition said dynamic lip further defines a theoretical intersection of said dynamic surface and said lubricant side flank, at least part of said theoretical intersection is a generally zig-zag shape with small blending curves.

26. The rotary seal assembly of claim 17, wherein in said uncompressed condition an extent line is defined by a substantial tangency between said inlet curvature and said dynamic surface, wherein said extent line has a generally zig-zag shape blended by an extent line blending curve at said narrowest surface location, said extent line extending in the circumferential direction from one of said narrower surface locations, past said first widest dynamic surface location and past said narrowest dynamic surface location to one of said wider surface locations.

27. The rotary seal assembly of claim 17, wherein in said uncompressed condition said dynamic lip further defines a theoretical intersection of said dynamic surface and said lubricant side flank, at least part of said theoretical intersection is a generally zig-zag shape.

28. The rotary seal assembly of claim 17, wherein said inwardly facing surface has an exposed length present between said first seal end and at least part of said lubricant side flank, said exposed length being present at at least said first widest dynamic surface location.

29. The rotary seal assembly of claim 17, wherein said inwardly facing surface has an exposed length present between said first seal end and at least part of said lubricant side flank, said exposed length being present at at least said narrowest dynamic surface location.

30. The rotary seal assembly of claim 17, wherein said lubricant side flank being an unconstrained geometry having no contact with said first groove wall.

31. The rotary seal assembly of claim 17, wherein in said uncompressed condition said dynamic exclusionary intersection being generally circular, and at least part of a theoretical intersection between said dynamic surface and said lubricant side flank varies in position from said dynamic exclusionary intersection in a wavy zig-zag shape.

32. The rotary seal assembly of claim 17, wherein said rotary seal is held in skew-resisting confinement at room temperature by virtue of simultaneous contact of said first seal end with said first groove wall and said second seal end with said second groove wall.

33. A rotary seal assembly, comprising:
a first machine component having a seal groove defined by generally opposing first and second groove walls and a peripheral groove wall;
a second machine component located at least partially within said first machine component having a relatively rotatable surface in generally opposed relation to said peripheral groove wall and rotatable relative to said first machine component;
a generally ring-shaped interference-type rotary seal located at least partially within said seal groove, said rotary seal comprising a seal body of resilient thermally expandable sealing material having an operating temperature range having an upper bound defined by an upper temperature, said seal body having first and second seal ends,
wherein in an uncompressed condition
said seal body including a dynamic lip of generally circular form, said dynamic lip having an abrupt dynamic exclusionary intersection, a dynamic surface facing radially inward, a lubricant side flank that is non-circular having a slope in an axial direction and located in spaced relation with respect to said dynamic exclusionary intersection and located entirely radially outward of said dynamic surface and in spaced relation to said dynamic surface, a hydrodynamic inlet curvature located between and separating said dynamic surface and said lubricant side flank and located in spaced relation with respect to said dynamic exclusionary intersection and being at least a portion of a wavy hydrodynamic geometry, said dynamic surface being separated from said lubricant side flank and extending from said inlet curvature to said dynamic exclusionary intersection, said dynamic surface having at least two wider surface locations, at least one of said wider surface locations being the widest dynamic surface location between two narrower surface locations, at least one of said two narrower surface locations being the narrowest dynamic surface location between said at least two wider surface locations;

said inlet curvature being located between and adjoining said lubricant side flank and said dynamic surface and extending from one of said narrower surface locations, past said widest dynamic surface location and past said narrowest dynamic surface location to one of said wider surface locations;

said slope of said lubricant side flank varies from said widest dynamic surface location to said narrowest dynamic surface location, said slope being steeper relative to said dynamic surface at said widest dynamic surface location than at said narrowest dynamic surface location;

said rotary seal held in skew-resisting confinement at said upper temperature by virtue of simultaneous contact of said first seal end with said first groove wall and said second seal end with said second groove wall;

said dynamic lip being held in compression against said relatively rotatable surface and defining a circumferential interfacial contact footprint against said relatively rotatable surface, said interfacial contact footprint comprising peripheral first and second footprint edges, said first footprint edge being generally wavy, said interfacial contact footprint having an axial footprint width between said first and second footprint edges, said interfacial contact footprint having at least two wider footprint locations, at least one of said wider footprint locations being the widest footprint location between two narrower footprint locations, at least one of said two narrower footprint locations being the narrowest footprint location between said at least two wider footprint locations;

wherein said compression of said dynamic lip against said relatively rotatable surface establishes interfacial contact pressure within said interfacial contact footprint including a lubricant-side pressure ridge along said first footprint edge, said lubricant-side pressure ridge having a ridgeline established by the maximum interfacial contact pressure of the lubricant-side pressure ridge at each circumferential location of said interfacial contact footprint, and at said widest footprint location said interfacial contact pressure increasing from zero at said first footprint edge to a greater value at a Position $P_2$ on said ridgeline, said rotary seal maintaining a positive value of $E_{WH}$ at said upper temperature, wherein $$E_{WH} = \text{Dimension } B_2 - \text{Width } W_1$$

where Dimension $B_2$ is an axial length from said second footprint edge to said Position $P_2$ on said ridgeline at said widest footprint location, and Width $W_1$ is said axial footprint width at said narrowest footprint location, and said Dimension $B_2$ is governed at least in part by said inlet curvature at said widest dynamic surface location.

34. The rotary seal assembly of claim 33, wherein said seal body having an inwardly facing surface, said dynamic lip projecting from said inwardly facing surface and at least a portion of said lubricant side flank being located between at least a portion of said inwardly facing surface of said seal body and said inlet curvature.

35. The rotary seal assembly of claim 33, wherein in said uncompressed condition said dynamic lip further defines a theoretical intersection of said dynamic surface and said lubricant side flank, at least part of said theoretical intersection is a generally zig-zag shape with small blending curves.

36. The rotary seal assembly of claim 33, wherein in said uncompressed condition an extent line is defined by a substantial tangency between said inlet curvature and said dynamic surface, wherein said extent line has a generally zig-zag shape blended by an extent line blending curve at said narrowest footprint location.

37. The rotary seal assembly of claim 33, wherein in said uncompressed condition said dynamic lip further defines a theoretical intersection of said dynamic surface and said lubricant side flank, at least part of said theoretical intersection is a generally zig-zag shape.

38. The rotary seal assembly of claim 33, wherein said seal body has an inwardly facing surface, said dynamic lip projecting from said inwardly facing surface and said inwardly facing surface has an exposed length present between said first seal end and at least part of said lubricant side flank, said exposed length being present at at least said widest dynamic surface location.

39. The rotary seal assembly of claim 33, wherein said seal body has an inwardly facing surface, said dynamic lip projecting from said inwardly facing surface and said inwardly facing surface has an exposed length present between said first seal end and at least part of said lubricant side flank, said exposed length being present at at least said narrowest dynamic surface location.

40. The rotary seal assembly of claim 33, wherein said lubricant side flank being an unconstrained geometry having clearance with respect to said first groove wall.

41. The rotary seal assembly of claim 33, wherein said dynamic exclusionary intersection being generally circular, said dynamic surface extending from said dynamic exclusionary intersection to said inlet curvature, and
   at least part of a theoretical intersection between said dynamic surface and said lubricant side flank varies in position from said dynamic exclusionary intersection in a wavy zig-zag shape.

42. The rotary seal assembly of claim 33, wherein said rotary seal held in skew-resisting confinement even at room temperature by virtue of simultaneous contact of said first seal end with said first groove wall and said second seal end with said second groove wall.

43. The rotary seal assembly of claim 33, wherein said rotary seal has a positive value of $E_{WH}$ of at least 0.020" at said upper temperature.

44. The rotary seal assembly of claim 33, wherein said rotary seal has a positive value of $E_{WH}$ of at least 0.020" at a temperature of 50° F. greater than said upper temperature.

45. The rotary seal assembly of claim 33, wherein said rotary seal has a positive value of $E_{WH}$ at a temperature of 50° F. greater than said upper temperature.

46. The rotary seal assembly of claim 33, wherein said first and second groove walls are spaced a fixed distance from one another.

47. The rotary seal assembly of claim 33, wherein at least one of said first and second groove walls is a spring-loaded moveable gland wall.

48. A rotary seal assembly, comprising:
   a first machine component having a seal groove defined by generally opposing first and second groove walls and a peripheral groove wall;
   a second machine component located at least partially within said first machine component having a relatively rotatable surface in generally opposed relation to said peripheral groove wall and rotatable relative to said first machine component;
   a generally ring-shaped interference-type rotary seal being located at least partially within said seal groove, said rotary seal comprising a seal body of at least one resilient thermally expandable sealing material having an operating temperature range with an upper bound defined by an upper temperature, said seal body having first and second seal ends, said rotary seal held in skew-resisting confinement at said upper temperature by virtue of simultaneous contact of said first seal end with said first groove wall and said second seal end with said second groove wall;
   wherein in an uncompressed condition
      said seal body including a dynamic lip and an inwardly facing surface, said dynamic lip projecting radially inward from said inwardly facing surface and comprising a dynamic exclusionary intersection of abrupt form, a dynamic surface facing radially inward, a lubricant side flank having a slope and located entirely radially outward of said dynamic surface and in spaced relation to said dynamic surface, and a hydrodynamic inlet curvature located between and separating said dynamic surface and said lubricant side flank, said inlet curvature being at least part of a hydrodynamic geometry,
      said dynamic surface having an axial width between said dynamic exclusionary intersection and said inlet curvature that in a circumferential direction increases from a first narrower surface location to a first wider surface location, decreases from said first wider surface location to a second narrower surface location, increases from said second narrower surface location to a second wider surface location, and decreases from said second wider surface location to a third narrower surface location,
      wherein said first wider surface location being situated between said first and second narrower surface locations and being the widest dynamic surface location between said first and second narrower surface locations, being referred to as the first widest dynamic surface location,
      said second narrower surface location being situated between said first and second wider surface locations and being the narrowest dynamic surface location between said first and second wider surface locations, being referred to as the first narrowest dynamic surface location, and
      said second wider surface location being situated between said second and third narrower surface locations and being the widest dynamic surface location between said second and third narrower surface locations, being referred to as the second widest dynamic surface location;
      said slope of said lubricant side flank varies from said first widest dynamic surface location to said first narrowest dynamic surface location, said slope being steeper relative to said dynamic surface at said first widest dynamic surface location than at said first narrowest dynamic surface location;
   said dynamic lip being held in compression against said relatively rotatable surface and defining a circumferential interfacial contact footprint against said relatively rotatable surface, said interfacial contact footprint comprising peripheral first and second footprint edges, said first footprint edge being generally wavy, said footprint having an axial footprint width between said first and second footprint edges that increases from a first narrower footprint location to a first wider footprint location, decreases from said first wider footprint location to a second narrower footprint location, increases from said second narrower footprint location to a second wider footprint location, and decreases from said second wider footprint location to a third narrower footprint location, wherein said first wider footprint location being situated between said first and second narrower footprint locations and being the widest footprint location between said first and second narrower footprint locations, being referred to as the first widest footprint location, said second narrower footprint location being situated between said first and second wider footprint locations and being the narrowest footprint location between said first and second wider footprint locations, being referred to as the first narrowest footprint location, and said second wider footprint location being situated between said second and third narrower footprint locations and being the widest footprint location between said second and third narrower footprint locations, being referred to as the second widest footprint location;

wherein said compression of said dynamic lip against said relatively rotatable surface establishes interfacial contact pressure within said footprint including a lubricant-side pressure ridge along said first footprint edge, said lubricant-side pressure ridge having a ridgeline established by the maximum interfacial contact pressure of the lubricant-side pressure ridge at each circumferential location of said interfacial contact footprint, and at said first widest footprint location said interfacial contact pressure increasing from zero at said first footprint edge to a greater value at a Position $P_2$ on said ridgeline, said rotary seal maintaining a positive value of $E_{WH}$ at said upper temperature wherein $$E_{WH} = \text{Dimension } B_2 - \text{Width } W_1$$

where Dimension $B_2$ is an axial length from said second footprint edge to said Position $P_2$ on said ridgeline at said first widest footprint location, and Width $W_1$ is said axial footprint width at said first narrowest footprint location; and said first widest footprint location corresponding circumferentially to said first widest dynamic surface location, and said first narrowest dynamic surface location corresponding circumferentially to said first narrowest footprint location.

49. The rotary seal assembly of claim 48, wherein at least a portion of said lubricant side flank being located between at least a portion of said inwardly facing surface and said inlet curvature.

50. The rotary seal assembly of claim 48, wherein in said uncompressed condition said dynamic lip further defines a theoretical intersection of said dynamic surface and said lubricant side flank, at least part of said theoretical intersection is a generally zig-zag shape with small blending curves.

51. The rotary seal assembly of claim 48, wherein in said uncompressed condition an extent line is defined by a substantial tangency between said inlet curvature and said dynamic surface, wherein said extent line has a generally zig-zag shape blended by an extent line blending curve at said first narrowest dynamic surface location.

52. The rotary seal assembly of claim 48, wherein in said uncompressed condition said dynamic lip further defines a theoretical intersection of said dynamic surface and said lubricant side flank, at least part of said theoretical intersection is a generally zig-zag shape.

53. The rotary seal assembly of claim 48, wherein said inwardly facing surface has an exposed length present between said first seal end and at least part of said lubricant side flank, said exposed length being present at at least said first widest dynamic surface location.

54. The rotary seal assembly of claim 48, wherein said inwardly facing surface has an exposed length present between said first seal end and at least part of said lubricant side flank, said exposed length being present at at least said first narrowest dynamic surface location.

55. The rotary seal assembly of claim 48, wherein said lubricant side flank being an unconstrained geometry.

56. The rotary seal assembly of claim 48, wherein in said uncompressed condition said dynamic exclusionary intersection being generally circular, and
   at least part of a theoretical intersection between said dynamic surface and said lubricant side flank varies in position from said dynamic exclusionary intersection in a wavy zig-zag shape.

57. The rotary seal assembly of claim 48, wherein said rotary seal held in skew-resisting confinement even at room temperature by virtue of simultaneous contact of said first seal end with said first groove wall and said second seal end with said second groove wall.

58. The rotary seal assembly of claim 48, wherein said rotary seal has a positive value of $E_{WH}$ of at least 0.020" at said upper temperature.

59. The rotary seal assembly of claim 48, wherein said rotary seal has a positive value of $E_{WH}$ of at least 0.020" in operating conditions having a temperature of 50° F. greater than said upper temperature.

60. The rotary seal assembly of claim 48, wherein said rotary seal has a positive value of $E_{WH}$ in operating conditions having a temperature of 50° F. greater than said upper temperature.

61. The rotary seal assembly of claim 48, wherein said first and second groove walls are spaced a fixed distance from one another.

62. The rotary seal assembly of claim 48, wherein at least one of said first and second groove walls is a spring-loaded moveable gland wall.

63. The rotary seal assembly of claim 48, wherein said inlet curvature extends continuously in a circumferential direction from said first widest dynamic surface location to said first narrowest dynamic surface location to said second widest dynamic surface location.

64. A rotary seal for bi-directional rotation, the rotary seal in an uninstalled condition comprising:
   a generally ring-shaped seal body having a circumference, said seal body having first and second seal ends, a dynamic lip and an inwardly facing surface having an exposed length;
   said dynamic lip projecting radially inward of said inwardly facing surface and comprising a lubricant side flank, a dynamic exclusionary intersection of abrupt generally circular form, a hydrodynamic inlet curvature, and a dynamic surface facing radially inward and ending at said abrupt dynamic exclusionary intersection, said hydrodynamic inlet curvature being located between and separating said lubricant side flank and said dynamic surface and varying in position from said dynamic exclusionary intersection about said circumference;
   said dynamic surface being located between said hydrodynamic inlet curvature and said dynamic exclusionary intersection, said dynamic surface having an axial width from said dynamic exclusionary intersection to said hydrodynamic inlet curvature that varies around said circumference of said seal body in a wavy fashion, having at least two wider surface axial width locations and at least two narrower surface axial width locations, one of said narrower surface axial width locations being the narrowest dynamic surface axial width location between said at least two wider surface axial width locations and one of said at least two wider surface width locations being the widest dynamic surface location between said at least two narrower surface axial width locations, said hydrodynamic inlet curvature adjoining said dynamic surface at and between said at least two narrower surface axial width locations and adjoining said dynamic surface at and between said at least two wider surface axial width locations; and said lubricant side flank being located entirely radially outward of said dynamic surface and in spaced relation to said dynamic surface, at least a portion of said lubricant side flank being located between at least a portion of said inwardly facing surface and said inlet curvature, said lubricant side flank having an end thereof varying in position from said dynamic exclusionary intersection in a wavy fashion and having a slope in the axial direction that varies along at least part of said circumference, said slope of said lubricant side flank being steeper relative to said dynamic surface at said wider surface axial width locations than at said narrower surface axial width locations.

65. The rotary seal of claim 64, wherein all of said lubricant side flank being located axially between said inwardly facing surface and said inlet curvature.

66. The rotary seal of claim 64, wherein said dynamic lip further defines a theoretical intersection of said dynamic surface and said lubricant side flank, at least part of said theoretical intersection is a generally zig-zag shape with small blending curves.

67. The rotary seal of claim 64, wherein an extent line is defined by a substantial tangency between said inlet curvature and said dynamic surface, wherein said extent line has a generally zig-zag shape blended by at least one extent line blending curve.

68. The rotary seal of claim 64, wherein said dynamic lip further defines a theoretical intersection of said dynamic surface and said lubricant side flank, at least part of said theoretical intersection is a generally zig-zag shape.

69. The rotary seal of claim 64, wherein said dynamic surface having a widest dynamic surface location, and said exposed length of said inwardly facing surface is present between said first seal end and at least part of said lubricant side flank, said exposed length being present at at least said widest dynamic surface location.

70. The rotary seal of claim 64, wherein said dynamic surface having a narrowest dynamic surface location, and said exposed length of said inwardly facing surface is present between said first seal end and at least part of said lubricant side flank, said exposed length being present at at least said narrowest dynamic surface location.

71. The rotary seal of claim 64, wherein said dynamic exclusionary intersection being generally circular, at least part of a theoretical intersection between said dynamic surface and said lubricant side flank varies in position from said dynamic exclusionary intersection in a wavy zig-zag shape.

72. The rotary seal of claim 64, wherein said slope of said lubricant side flank is represented by an angle α having a vertex when viewed in longitudinal cross-section, said vertex of said angle a α is a theoretical intersection formed by extending the lines of said dynamic surface and said lubricant side flank.

73. A hydrodynamic rotary seal for bi-directional rotation, the rotary seal in an uninstalled condition comprising:
a circumferential seal body having a dynamic lip of generally circular form, said seal body forming a ring comprised of sealing material having a thermally expandable seal volume;
said seal body having an inwardly facing surface, said dynamic lip projecting radially inwardly from said inwardly facing surface and including a dynamic exclusionary intersection of abrupt form, a dynamic surface facing radially inward and having an end at said dynamic exclusionary intersection, a lubricant side flank that is non-circular and located in spaced relation with respect to said dynamic exclusionary intersection and located entirely radially outward of said dynamic surface and in spaced relation to said dynamic surface, and a hydrodynamic inlet curvature located between and separating said dynamic surface and said lubricant side flank;
said dynamic surface having narrower surface locations and wider surface locations, each of said wider surface locations being the axially widest dynamic surface location between a pair of said narrower surface locations, and at least one of said narrower surface locations being the axially narrowest dynamic surface location between a pair of said wider surface locations;
said inlet curvature being at least a portion of a rotationally bi-directional hydrodynamic inlet capable of providing hydrodynamic lubrication of said dynamic surface in response to clockwise and counter-clockwise relative rotation when installed against a relatively rotatable surface and exposed to a lubricant, said inlet curvature adjoining said dynamic surface at said wider and said narrower surface locations;
said lubricant side flank having a slope in an axial direction that varies in steepness relative to said dynamic surface, said slope of said lubricant side flank being steeper relative to said dynamic surface at said wider surface locations compared to said slope at said at least one narrower surface location, said slope at said wider surface locations minimizing said seal volume.

74. The rotary seal of claim 73, wherein at least a portion of said lubricant side flank being located between at least a portion of said inwardly facing surface and said inlet curvature.

75. The rotary seal of claim 73, wherein said dynamic lip further defines a theoretical intersection of said dynamic surface and said lubricant side flank, at least part of said theoretical intersection is a generally zig-zag shape with small blending curves.

76. The rotary seal of claim 73, wherein an extent line is defined by a substantial tangency between said inlet curvature and said dynamic surface, wherein said extent line has a generally zig-zag shape blended by at least one extent line blending curve, said extent line extending in a circumferential direction from one of said narrower surface locations, past said widest dynamic surface location and past said narrowest dynamic surface location to one of said wider surface locations.

77. The rotary seal of claim 73, wherein said dynamic lip further defines a theoretical intersection of said dynamic surface and said lubricant side flank, at least part of said theoretical intersection is a generally zig-zag shape.

78. The rotary seal of claim 73, wherein said inwardly facing surface has an exposed length present between said first seal end and at least part of said lubricant side flank, said exposed length being present at at least said widest dynamic surface location.

79. The rotary seal of claim 73, wherein said inwardly facing surface has an exposed length present between said first seal end and at least part of said lubricant side flank, said exposed length being present at at least said narrowest dynamic surface location.

80. The rotary seal of claim 73, wherein said dynamic exclusionary intersection being generally circular, and at least part of a theoretical intersection between said dynamic surface and said lubricant side flank varies in position from said dynamic exclusionary intersection in a wavy zig-zag shape.

81. The rotary seal of claim 73, wherein at least a portion of said lubricant side flank being located between at least a portion of said inwardly facing surface and said inlet curvature.

82. A ring-shaped hydrodynamic rotary seal for bi-directional rotation, the hydrodynamic rotary seal in an uncompressed condition comprising:
a ring-shaped seal body having a first end and an inwardly facing surface;
said seal body including a dynamic lip of generally circular form projecting radially inward from said inwardly facing surface and having a dynamic exclusionary intersection of abrupt form, a dynamic surface facing radially inward, a lubricant side flank that is non-circular and located in spaced relation with respect to said dynamic exclusionary intersection and located entirely radially outward of said dynamic surface and in spaced relation to said dynamic surface, a hydrodynamic inlet curvature located between and separating said dynamic surface and said lubricant side flank and located in spaced relation with respect to said dynamic exclusionary intersection and being at least a portion of a wavy, rotationally bi-directional hydrodynamic geometry, said dynamic surface extending from said inlet curvature to said dynamic exclusionary intersection;
said dynamic surface having at least two wider surface locations, at least one of said wider surface locations being the widest dynamic surface location between two narrower surface locations, at least one of said two narrower surface locations being the narrowest dynamic surface location between said at least two wider surface locations;
said hydrodynamic inlet curvature being located between and adjoining said lubricant side flank and said dynamic surface and extending continuously in a circumferential direction from one of said narrower surface locations, past said widest dynamic surface location and past narrowest dynamic surface location to one of said wider surface locations;
said lubricant side flank having a slope that varies from said widest dynamic surface location to said narrowest dynamic surface location, said slope being steeper relative to said dynamic surface at said widest dynamic surface location than at said narrowest dynamic surface location; and
said rotary seal being comprised of seal material having a volume, said slope of said lubricant side flank being steepest relative to said dynamic surface at said widest dynamic surface location minimizing said volume of said seal material.

83. The rotary seal of claim 82, wherein said lubricant side flank being located between at least a portion of said inwardly facing surface and said inlet curvature.

84. The rotary seal of claim 82, wherein said dynamic lip further defines a theoretical intersection of said dynamic surface and said lubricant side flank, at least part of said theoretical intersection is a generally zig-zag shape with small blending curves.

85. The rotary seal of claim 82, wherein an extent line is defined by a substantial tangency between said inlet curvature and said dynamic surface, wherein said extent line has a generally zig-zag shape blended by an extent line blending curve at said narrowest dynamic surface location, said extent line extending in the circumferential direction from one of said narrower surface locations, past said widest dynamic surface location and past said narrowest dynamic surface location to one of said wider surface locations.

86. The rotary seal of claim 82, wherein said dynamic lip further defines a theoretical intersection of said dynamic surface and said lubricant side flank, at least part of said theoretical intersection is a generally zig-zag shape.

87. The rotary seal of claim 82, wherein said inwardly facing surface has an exposed length present between said first seal end and at least part of said lubricant side flank, said exposed length being present at at least said widest dynamic surface location.

88. The rotary seal of claim 82, wherein said inwardly facing surface has an exposed length present between said first seal end and at least part of said lubricant side flank, said exposed length being present at at least said narrowest dynamic surface location.

89. The rotary seal of claim 82, wherein said dynamic exclusionary intersection being generally circular, and at least part of a theoretical intersection between said dynamic surface and said lubricant side flank varies in position from said dynamic exclusionary intersection in a wavy zig-zag shape.

90. The rotary seal of claim 82, wherein at least a portion of said lubricant side flank being located between at least a portion of said inwardly facing surface and said inlet curvature.

91. A hydrodynamic rotary seal for bi-directional rotation, the rotary seal in an uninstalled condition comprising:
a generally ring-shaped seal body having a first seal end and an inwardly facing surface;
said seal body including a dynamic lip projecting radially inward from said inwardly facing surface and comprising a dynamic surface facing radially inward, a lubricant side flank having a slope and located entirely radially outward of said dynamic surface and in spaced relation to said dynamic surface, and a hydrodynamic inlet curvature located between and separating said dynamic surface and said lubricant side flank, said inlet curvature being at least part of a rotationally bi-directional hydrodynamic geometry, said dynamic surface having an axial width that increases from a first narrower surface location to a first wider surface location, decreases from said first wider surface location to a second narrower surface location, increases from said second narrower surface location to a second wider surface location, and decreases from said second wider surface location to a third narrower surface location,
wherein said first wider surface location being situated between said first and second narrower surface locations and being the widest dynamic surface location between said first and second narrower surface locations, being referred to as the first widest dynamic surface location,
said second narrower surface location being situated between said first and second wider surface locations and being the narrowest dynamic surface location between said first and second wider surface locations, said second wider surface location being situated between said second and third narrower surface locations and being the widest dynamic surface location between said second and third narrower surface locations, being referred to as the second widest dynamic surface location, and wherein said slope of said lubricant side flank varies from said first widest dynamic surface location to said narrowest dynamic surface location, said slope being steeper relative to said dynamic surface at said first widest dynamic surface location than at said narrowest dynamic surface location.

92. The rotary seal of claim 91, wherein said lubricant side flank being located between at least a portion of said inwardly facing surface and said inlet curvature.

93. The rotary seal of claim 91, wherein said dynamic lip further defines a theoretical intersection of said dynamic surface and said lubricant side flank, at least part of said theoretical intersection is a generally zig-zag shape with small blending curves.

94. The rotary seal of claim 91, wherein an extent line is defined by a substantial tangency between said inlet curvature and said dynamic surface, wherein said extent line has a generally zig-zag shape blended by an extent line blending curve at said narrowest dynamic surface location, said extent line extending in a circumferential direction from one of said narrower surface locations, past said first widest dynamic surface location and past said narrowest dynamic surface location to one of said wider surface locations.

95. The rotary seal of claim 91, wherein said dynamic lip further defines a theoretical intersection of said dynamic surface and said lubricant side flank, at least part of said theoretical intersection is a generally zig-zag shape.

96. The rotary seal of claim 91, wherein said inwardly facing surface has an exposed length present between said first seal end and at least part of said lubricant side flank, said exposed length being present at at least said first widest dynamic surface location.

97. The rotary seal of claim 91, wherein said inwardly facing surface has an exposed length present between said first seal end and at least part of said lubricant side flank, said exposed length being present at at least said narrowest dynamic surface location.

98. The rotary seal of claim 91, wherein said dynamic exclusionary intersection being generally circular, and at least part of a theoretical intersection between said dynamic surface and said lubricant side flank varies in position from said dynamic exclusionary intersection in a wavy zig-zag shape.

99. The rotary seal of claim 91, wherein at least a portion of said lubricant side flank being located between at least a portion of said inwardly facing surface and said inlet curvature.

* * * * *